US007227894B2

(12) United States Patent
Lin et al.

(10) Patent No.: US 7,227,894 B2
(45) Date of Patent: Jun. 5, 2007

(54) METHOD AND APPARATUS FOR MPEG-4 FGS PERFORMANCE ENHANCEMENT

(75) Inventors: Chia-Wen Lin, Chiayi (TW); Su-Ren Chen, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 564 days.

(21) Appl. No.: 10/786,971

(22) Filed: Feb. 24, 2004

(65) Prior Publication Data

US 2005/0185714 A1 Aug. 25, 2005

(51) Int. Cl.
*H04N 7/18* (2006.01)
(52) U.S. Cl. .............................. 375/240.12; 375/240.13
(58) Field of Classification Search ................................ 375/240.01–240.29
See application file for complete search history.

(56) References Cited

U.S. PATENT DOCUMENTS 6,961,383 B1 * 11/2005 Reibman et al. ........ 375/240.25
6,996,173 B2 * 2/2006 Wu et al. ................. 375/240.1

OTHER PUBLICATIONS

D. Wu, Y. T. Hou, W. Zhu, Y.-Q. Zhang, and J. M. Peha, "Streaming video over the Internet: approaches and directions" *IEEE Trans. Circuits Syst. Video Technol.*, vol. 11, No. 3, pp. 282-300, Mar. 2001.

ISO/IEC14496-2:1999/FDAM4 "Information technology—Coding of audio-visual objects—Part 2: Visual, Amendment 4: Streaming video profile", *ISO/IEC JTC1/SC29/WG11, MPEG01/N3904*, Jan. 2001.

W. Li, "Overview of fine granularity in MPEG-4 video standard," *IEEE Trans. Circuits Syst. Video Technol.*, vol. 11, No. 3, pp. 301-317, Mar. 2001.

M. van der Schaar and H. Radha, "The MPEG-4 fine-grained scalable video coding method for multimedia streaming over IP," *IEEE Trans. Circuits Syst. Video Technol.*, vol. 11, No. 3, pp. 318-331, Mar. 2001.

F. Wu, S. Li, and Y.-Q. Zhang, "A framework for efficient progressive fine granularity scalable video coding," *IEEE Trans. Circuits Syst. Video Technol.* vol. 11, No. 3, pp. 332-344, Mar. 2001.

M. van der Schaar and H. Radha, "Adaptive motion-compensation fine-granular-scalability (AMC-FGS) for wireless video," *IEEE Trans. Circuits Syst. Video Technol.* vol. 12, No. 6, pp. 360-371, Jun. 2002.

(Continued)

*Primary Examiner*—Andy Rao

(57) ABSTRACT

An architecture of a fine granularity scalable (FGS) codec has an encoder and a decoder configurable in three prediction modes. The coarse prediction loop in the base layer of the encoder has a switch for selecting either coarse prediction output or fine prediction output in the encoder. The fine prediction loop in the enhancement layer of the encoder also has a switch for selecting either coarse prediction output or fine prediction output. Two-pass encoding is used in the encoder. The first pass extracts coding parameters and classifies macroblocks of a video frame into three groups each being assigned with all-coarse prediction mode, all-fine prediction mode or mix prediction. The second pass uses the assigned modes to encode the macroblocks. A rate adaptation algorithm is provided to truncate the enhancement bit-planes for low bit rate, medium bit rate and high bit rate and allocate bit efficiently for achieving higher video quality.

17 Claims, 19 Drawing Sheets

OTHER PUBLICATIONS

H.-C. Huang, C.-N. Wang, and T. Chiang, "A robust fine granularity scalability using trellis-based predictive leak," *IEEE Trans. Circuits Syst. Video Technol.*, pp. 372-385, vol. 12, No. 6, Jun. 2002.

F. Wu, S. Li, R. Yan, X. Sun and Y.-Q. Zhang, "Efficient and universal scalable video coding," in *Proc. IEEE Int. Conf. Image Processing*, vol. 2, pp. 37-40, Sep. 2002, Rochester.

A. R. Reibman, L. Bottou, and A. Basso, "Scalable coding with managed drift," *IEEE Trans. Circuits Syst. Video Technol.* vol. 13, No. 2, pp. 131-140, Feb. 2003.

Y. He, X. Zhao, Y. Zhong, and S. Yang, "Improved fine granular scalable coding with interlayer prediction," in *Proc. IEEE Data Compression Conf.*, pp. 172-181, Apr. 2002, Snowbird, US.

B. Girod, "SNR Scalable Coding with Leaky Prediction," ITU-T SG16/Q6, VCEG-N53, Santa Barbara, CA, USA, Sep. 15, 2001.

Y. He, F. Wu, S. Li, Y. Zhong, and S. Yang, "H.26L-based fine granularity scalable video coding," in *Proc. IEEE Int. Symp. Circuits Syst. Video Technol.*, vol. 4, pp. 548-551, May 2002, Phoenix, Arizona.

\* cited by examiner

METHOD AND APPARATUS FOR MPEG-4 FGS PERFORMANCE ENHANCEMENT

FIELD OF THE INVENTION

The present invention generally relates to fine granularity scalable codec, and more specifically to the architecture, prediction mode and bit allocation of fine granularity scalable codec.

BACKGROUND OF THE INVENTION

Applications of multimedia are more and more popular in today's world. For instance, one can listen to a CD player or access a web page via the Internet. One of the common problems in multimedia applications via the Internet is that the data of uncompressed video is too large for storage and transmission. Several coding standards have been defined by ITU-T and ISO-IEC MPEG committees to address data compression issues. With the establishment of these standards, it is much easier to store and transmit video data.

Because the Internet technology has advanced greatly over the past few years, one can read a web page, play games, and download files over the Internet nowadays. Streaming video is an important web application. People can access pre-encoded video clips from a video server via the network. The greatest advantage of streaming video is people can subscribe the video data through the Internet connection from anywhere. In streaming video, users may access videos from heterogeneous networks such as ADSL, cable modem, etc. Due to the bandwidth variations, the streaming video provider must transmit the bitstream at variable bit-rates.

There are some traditional methods for bit-rate adaptation. One is to encode multiple bitstreams at the encoding time. However, in video multicast environment, hundreds or thousands of clients may access the data at the same time. The total bit rate required is the sum of the bit rates of these multiple bitstreams. Another is to encode the bitstream at a highest bit-rate of the Internet and then transcode the bitstream into different bit-rates. First, the transcoder decodes the encoded bitstream, and then re-encodes it to meet the bit-rate that is suitable for each client. In this way, the streaming video provider can use a transcoder to transcode the bitstream into different bit-rates for different users.

A new concept called Fine Granularity Scalability (FGS) was proposed and standardized in MPEG-4 Draft Amendment 4. FGS contains one base layer and one enhancement layer. The FGS base layer is generated using an MPEG-4 coder at the lowest bit rate of all possible connections. FGS takes the original and reconstructed discrete cosine transform (DCT) coefficients to generate the enhancement layer bitstream using bit-plane coding. The reconstructed DCT coefficients are subtracted from the original ones to generate the residues introduced by the quantization process. Then the FGS codec uses bit-plane coding to encode these residues and outputs these bit-planes from the most significant bit (MSB) to the least significant bit (LSB). The enhancement layer can be truncated at any amount of bits. If the client has extra bandwidth after receiving the FGS base layer, it can also receive the enhancement layer. The more the FGS enhancement bit-planes are received, the better the reconstructed quality is. FGS provides a bit-rate range from the base-layer bit-rate to the upper bound of the client bandwidth. Therefore FGS is very suitable for streaming video with multicasting. As shown in FIG. 1, all clients (client 1, 2, 3) can receive the FGS base layer at minimum perceptual quality. Because of insufficient bandwidth, client 1 can not receive the FGS enhancement layer. But client 2 and client 3 can receive the FGS bit-planes as many as they can.

Because FGS can support a wide range of bit-rates to adapt to bandwidth variations, it is much more flexible than other coding schemes for streaming video applications. Therefore FGS becomes more and more popular in streaming video applications. While providing such a high flexibility for bandwidth adaptation, the coding efficiency of an FGS coder is not as good as that of a non-scalable coder at the same bit-rate. The inefficient coding performance mainly results from two factors. First, only coarse predictions are used for the motion-compensated predictive coding of the FGS base-layer, while the coding residuals (the image details) reconstructed from the enhancement-layer are not used for prediction. Second, there is no motion-compensated prediction loop involved in the FGS enhancement-layer coder. That is, each FGS enhancement-layer frame is intra-layer coded. Since the FGS base-layer is encoded at the lowest bit-rate with the minimal human perceptual visual quality, the coding gain in the temporal prediction of the FGS base layer is usually not as good as that for a non-scalable coder.

FIG. 2 shows the encoding process to produce the FGS base-layer and enhancement-layer bitstreams. The base layer is encoded using an MPEG-4 non-scalable coder at bit-rate $R_b$. The FGS enhancement-layer coder uses the original and the de-quntizeded DCT coefficients as its inputs and generates the FGS enhancement-layer bitstream using bit-plane coding. The encoding procedure of the FGS enhancement-layer bitstream goes as follows. First, the de-quantized DCT coefficients are subtracted from the original DCT coefficients to obtain the quantization residues. After generating all DCT residues of a frame, the enhancement-layer coder finds the maximum absolute value of these DCT residues to determine the maximum number of bit-planes for this frame. After defining the maximum number of bit-planes in a frame, the FGS enhancement-layer coder will output the enhancement data bit-plane by bit-plane started from the most significant bit-plane (MSB plane) to the least significant bit-plane (LSB plane). The binary bits in each bit-plane are converted into symbols, and variable length encoded to generate the output bitstream. The following example illustrates the procedure, where the absolute quantization residues of a DCT block are given as follows:

5, 0, 4, 1, 2, 0, . . . 0, 0

The maximum value in this block is 5 and the number of bits to represent 5 in a binary format (101) is 3. Writing every value in binary format, the 3 bit-planes are formed:

1, 0, 1, 0, 0, 0 . . . 0, 0 (MSB)

0, 0, 0, 0, 1, 0 . . . 0, 0 (MSB-1)

1, 0, 0, 1, 0, 0 . . . 0, 0 (LSB)

FIG. 3 illustrates the FGS decoding process for the enhancement-layer frame reconstruction. The process of decoding the FGS base layer is the same as that of decoding an MPEG-4 non-scalable bitstream. Due to the embedded characteristics of FGS streams, the decoder receives and variable-length decodes the bit-planes of DCT residues from the MSB bit-plane to the LSB bit-plane. Because the decoder may not receive all blocks of some specific bit-plane, the decoder fills 0's into the non-received blocks of bit-planes and performs IDCT to convert the received DCT coefficients into the pixel values. These pixel values are subsequently added to the base-layer decoded frame to obtain the final enhanced video image.

Although FGS can support a wide range of bit-rates to ease the adaptation of channel variations, it, however, presents some disadvantages. Referring to FIG. 2, the input signal fed into the enhancement-layer coder is the quantization error of the prediction residue of the incoming video with reference to its base-layer reconstructed version, which is encoded at the lowest bit-rate with the minimum visual quality. In this way, the base-layer video is usually not able to approximate the incoming video with high accuracy, so the quantization error is relatively large, thereby leading to low coding efficiency. The performance of single-layer coding is better than the FGS coding at the same transmission bit-rate because the single-layer coding uses the full-quality video for prediction. The performance degradation can be up to 1.5 to 2.5 dB as reported in the prior arts.

To overcome this problem, there have been several relevant works proposed for enhancing the visual quality of FGS coding as will be briefly described below.

A method to improving the FGS coding efficiency, referred to as "Adaptive Motion Compensated FGS" (AMC-FGS) has been proposed. The AMC-FGS codec is featured with two simplified scalable codecs: one-loop and two-loop MC-FGS with different degrees of coding efficiency and error resilience. The two-loop MC-FGS employs an additional MCP loop at the enhancement-layer coder for only B-frames to obtain better coding efficiency. Since B-frames are not referenced by other frames for prediction during encoding and decoding, there will be no error propagation due to the loss of B-frame data. If drifting errors occur in one B-frame, the drifting errors will not propagate to the following frames. The one-loop MC-FGS introduces fine predictions for P- and B-frames, leading to relatively higher coding efficiency compared to the two-loop MC-FGS. However, the error robustness would become significantly lower since the drifting error can be rather significant if the enhancement-layer data used for prediction of the base layer of P-frames cannot be received at the decoder due to packet losses caused by insufficient channel bandwidth or channel error, leading to significant quality degradation. An adaptive decision algorithm is used in AMC-FGS to dynamically switch over the two prediction schemes to achieve better tradeoff in terms of coding efficiency and error robustness.

A new FGS structure which is called "Progressive FGS (PFGS)" has also been proposed. In the proposed structure, the enhancement layer not only can refer to the FGS base layer but also can refer to the previous enhancement-layer data. However, the same drifting errors also confuse the output quality if referenced bit-planes can not be guaranteed to transmit to the decoder when the bandwidth is dropped.

Another method that has been proposed is referred to as "Robust Fine Granularity Scalability (RFGS)". The method focuses on the tradeoff between coding efficiency and robustness by adopting additional motion compensation (MC) loop at the enhancement layer and including leaking prediction. The extra MC loop can improve the coding efficiency by referencing high quality frame memory, and the accompanied drift errors are handled by leaking prediction. A leaky factor a ($0 \leq \alpha \leq 1$), which is bound with the estimated drift errors, is introduced into the reconstructed frame memory at the enhancement layer. And, a separated factor introduced is the number of referenced bit-planes β ($0 \leq \beta \leq 1$ maximal number of bit-planes) which is utilized in partial prediction. By adjusting both factors, the RFGS can provide flexibility of various encoding schemes. If the leaky factor ($\alpha$) is set to zero, it is almost the same as the original FGS. If the factor ($\alpha$) is set to unity for all referencing frames, the prediction modes of RFGS and MC-FGS are equal.

SUMMARY OF THE INVENTION

This invention has been made to enhance the performance of the fine granularity scalable codec. The primary object of this invention is to provide a new architecture of FGS codec with three prediction modes that can be adaptively selected. Another object of the invention is to provide a method to adaptively select a prediction mode for each macroblock of input signals. It is yet another object to provide a method of enhancement-layer bit-plane truncation for the FGS codec.

According to the invention, both the encoder and the decoder of the fine granularity scalable codec have a base layer which comprises a coarse prediction loop with a base layer mode selector, and an enhancement layer which comprises a fine prediction loop with an enhancement-layer mode selector. The base-layer mode selector can be controlled to select the output of either coarse or fine prediction for the base layer. Similarly, the enhancement-layer mode selector can also be controlled to select the output of either coarse or fine prediction for the enhancement layer.

Three prediction modes are provided for the fine granularity scalable codec of this invention. The codec operates in an all-fine prediction mode when both the base-layer mode selector and the enhancement-layer mode selector are switched to select the fine prediction output, in an all-coarse prediction mode when both the base-layer mode selector and the enhancement-layer mode selector are switched to select the coarse prediction output, and in a mix prediction mode when the base-layer mode selector is switched to select the coarse prediction output and the enhancement-layer mode selector is switched to select the fine prediction output.

The prediction modes of the encoder are adaptively selected for each macroblock of the input video signals. A two-pass encoding procedure is adopted in this invention. In the first-pass encoding, the encoding parameters of all macroblocks are collected, including prediction error values of fine and coarse predictions, and best-case and worst-case estimated mismatch errors introduced with the fine prediction in the case that the enhancement layer data used for prediction cannot be received at the decoder. A coding gain is derived from the fine and coarse prediction error values and a predicted mismatch error is derived from the best-case and worst-case estimated mismatch errors. A coding efficiency metric defined as the ratio of the coding gain over the predicted mismatch error is computed for each macroblock. The mean and standard deviation of the coding efficiencies from all the macroblocks in a frame are also computed.

The macroblocks are then classified into three groups based on the coding efficiency of each macroblock. The macroblocks of each group are assigned and encoded with an identical prediction mode. A macroblock is encoded with the all-coarse prediction mode if the coding efficiency of the macroblock is smaller than the difference of the coding efficiency mean and a pre-determined multiple of the coding efficiency standard deviation, and the macroblock is encoded with the all-fine prediction mode if the coding efficiency of the macroblock is larger than the sum of the coding efficiency mean and the pre-determined multiple of the coding efficiency standard deviation. Otherwise the macroblock is encoded with the mix prediction mode.

A new rate adaptation algorithm is further provided for truncating the enhancement-layer bit-planes with three different cases of available bandwidths: low bit-rate, medium bit-rate and high bit-rate. In the low bit-rate case, the enhancement-layer bit-planes of I/P-frames are truncated as much as possible. The bit allocation is made only for I/P-frames while the enhancement layer data of B-frames are all dropped in truncation. In the medium bit-rate case, excessive bits are distributed to B-frames after the bit allocations to I/P-frames can guarantee the bit-planes of I/P-frames used for fine prediction can be completely sent. In the high bit-rate case, the number of bits for distribution is controlled by the size of bit-planes and varies at particular-bit-rates. To avoid a large variation between two neighboring frames if no more bits are allocated to I/P-frames, the distributed bit-allocations among frames should be balanced.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
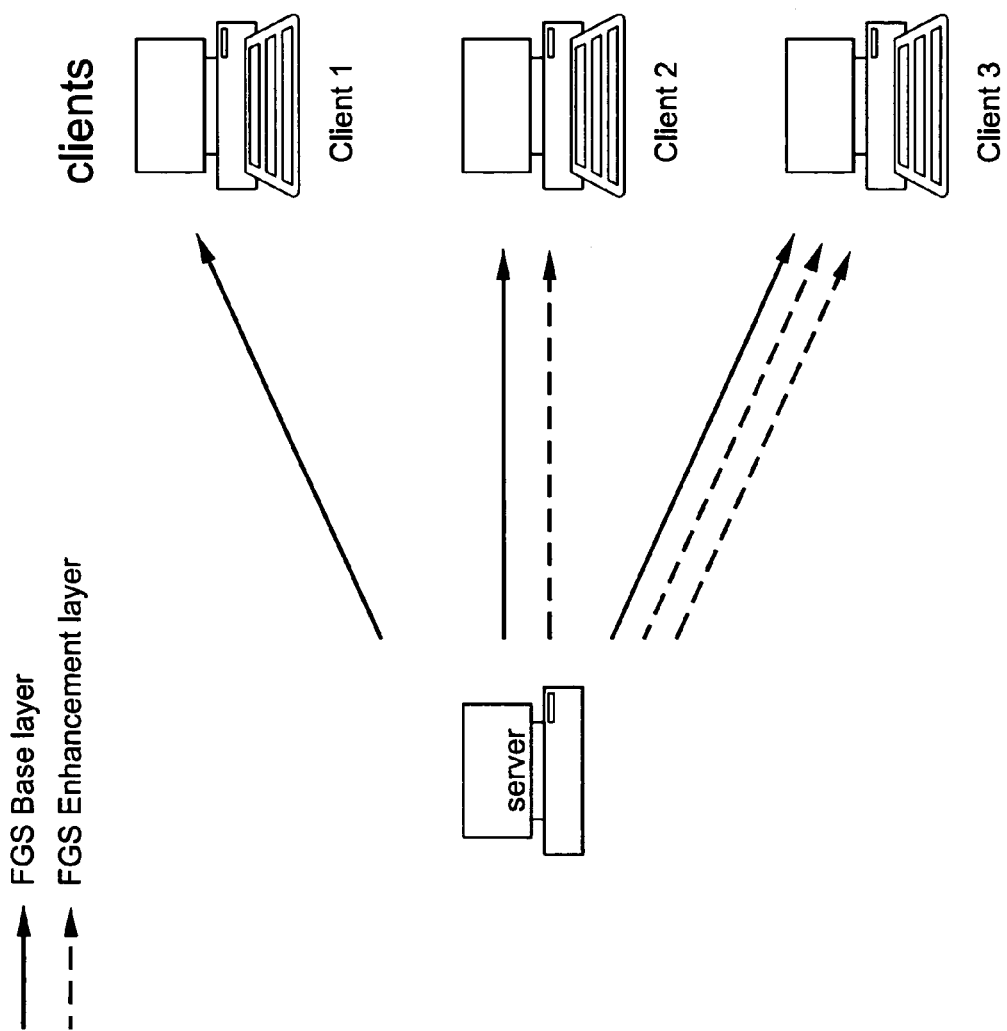
FIG. 1 shows how FGS bitstreams are transmitted to different clients with different bandwidth.
Figure 2:
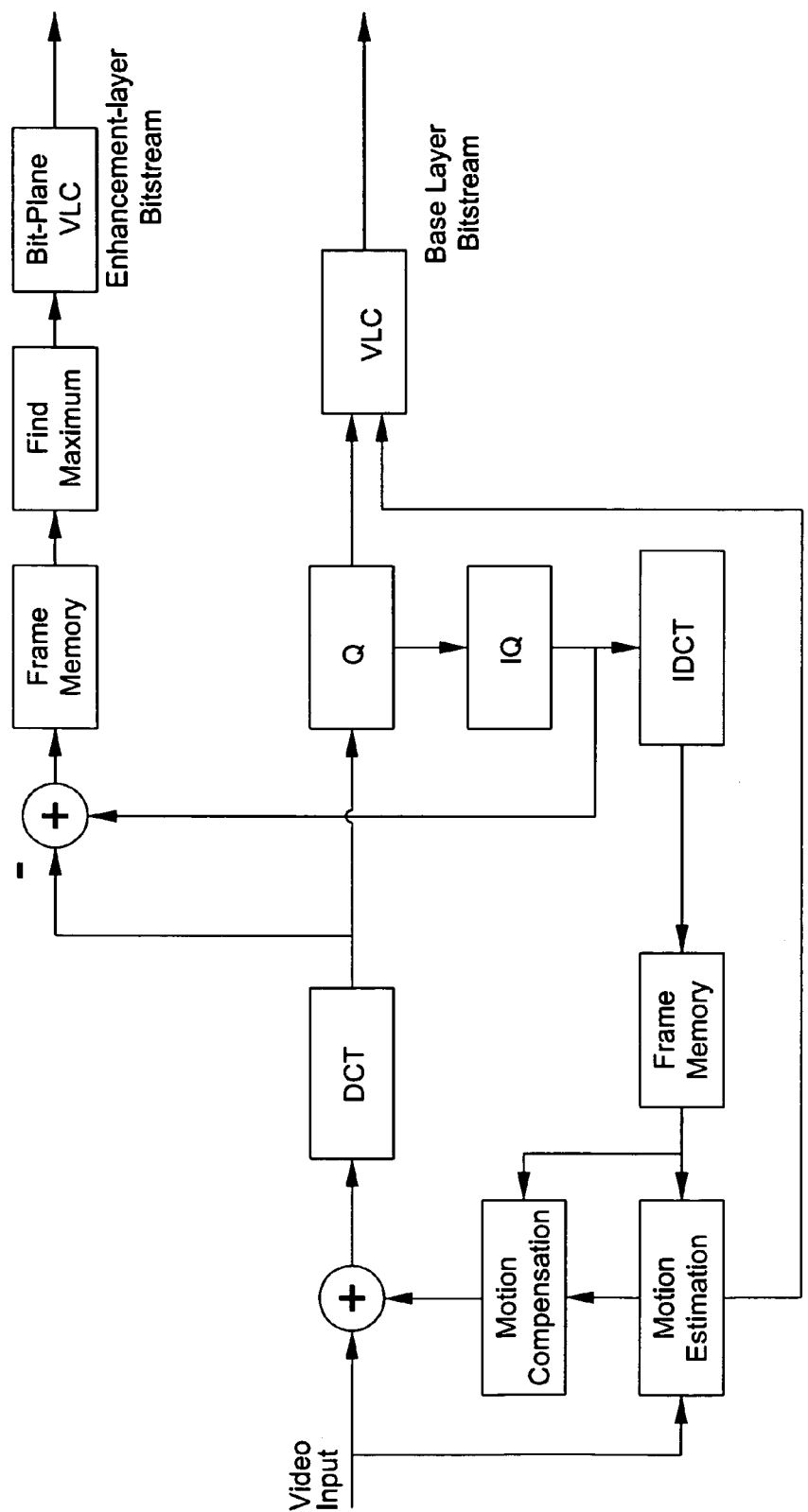
FIG. 2 shows the encoding process to produce the FGS base-layer and enhancement-layer bitstreams.
Figure 3:
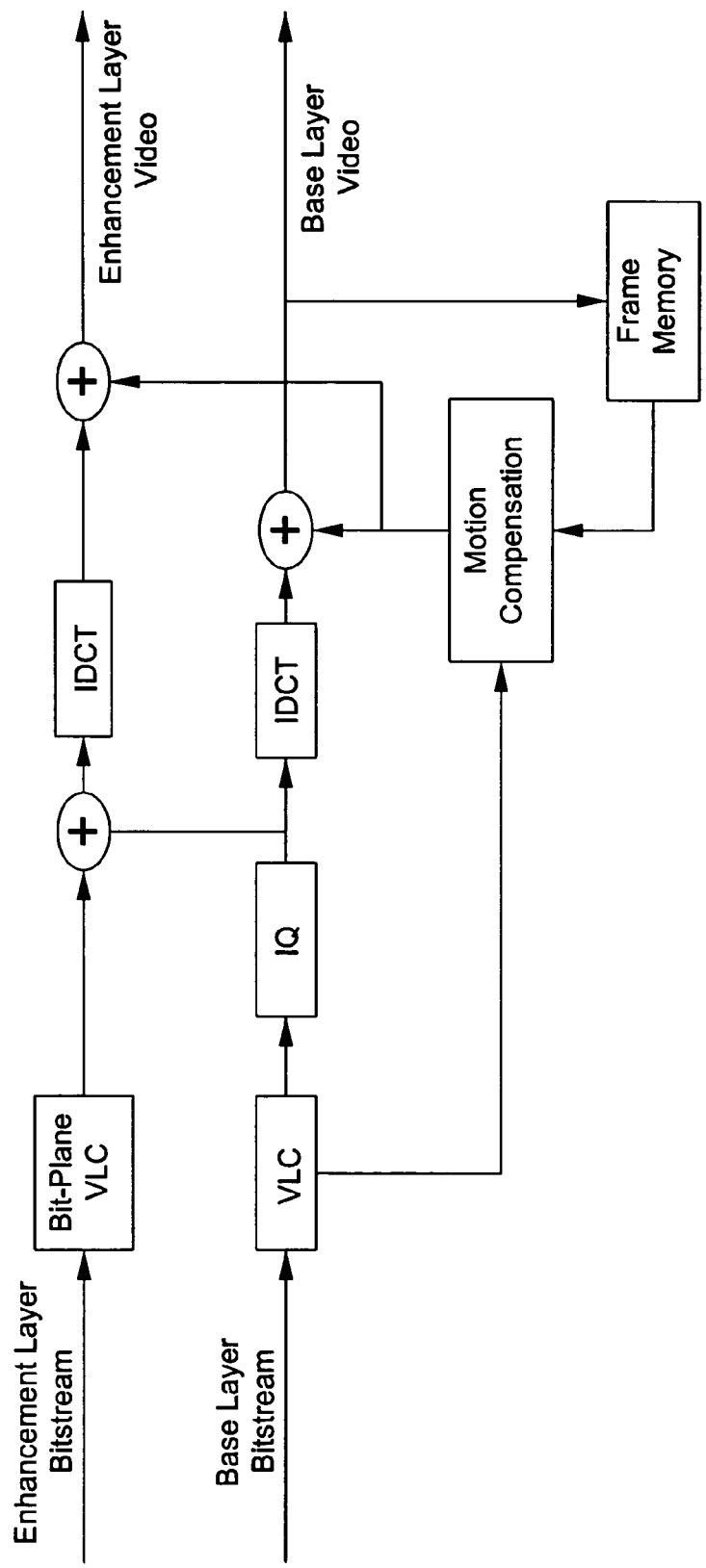
FIG. 3 shows the decoding process for the FGS base-layer and enhancement-layer frame reconstruction.
Figure 4:
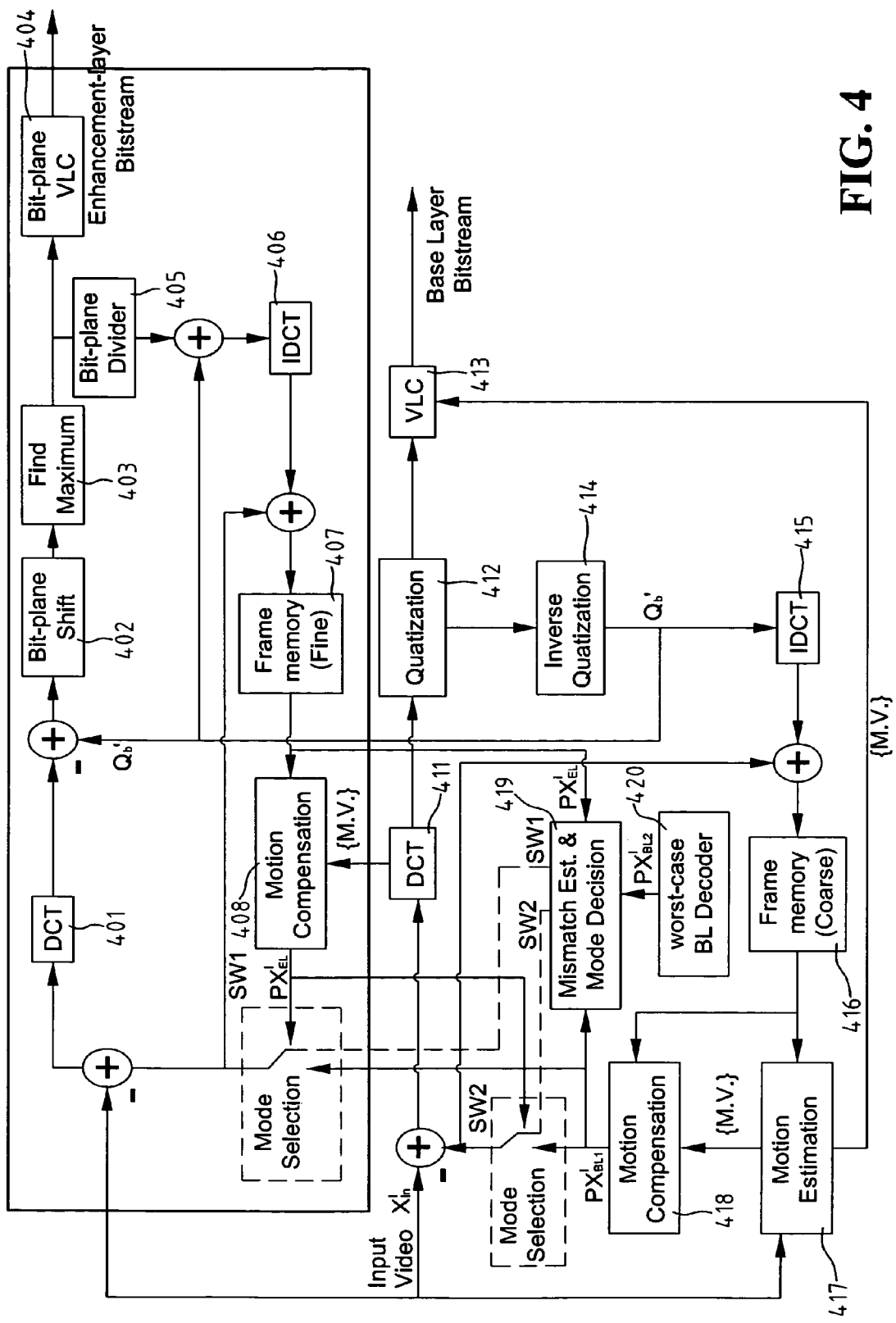
FIG. 4 shows the encoder structure of the novel FGS codec with inter-layer prediction according to the present invention.
Figure 5:
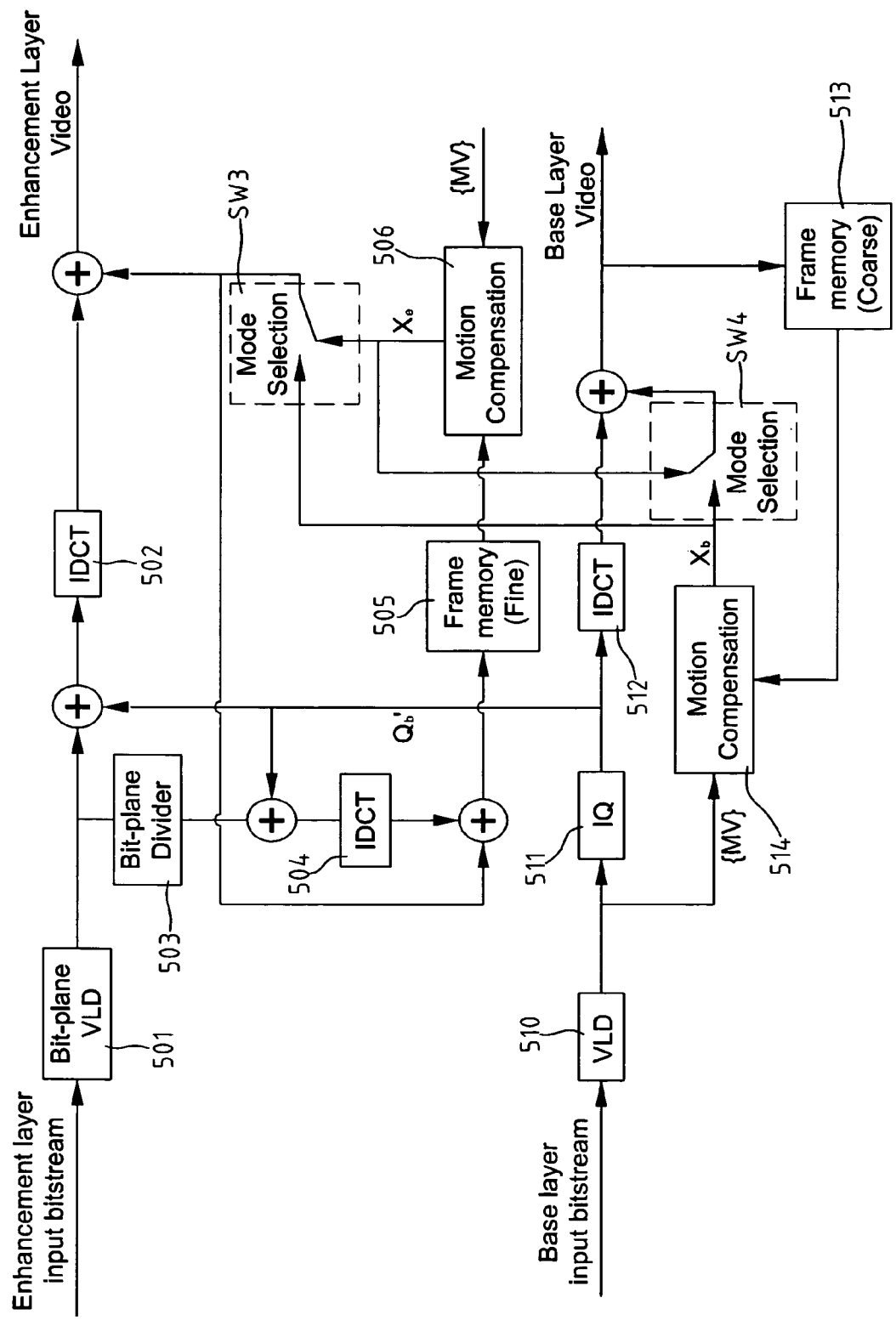
FIG. 5 shows the decoder structure of the novel FGS codec with inter-layer prediction according to the present invention.

FIGS. 4 and 5 depict the block diagrams of the novel three-mode FGS codec according to the present invention. As shown in FIG. 4, the encoder structure comprises an enhancement layer and a base layer. The enhancement layer has a DCT unit 401, a bit-plane shift unit 402, a maximum value finder 403, a bit-plane variable length coder 404, and a fine prediction loop which includes a bit-plane divider 405, an IDCT unit 406, a fine frame memory 407 and a motion compensation unit 408 with a switch SW1 for configuring the prediction modes in the enhancement layer. The base layer has a DCT unit 411, a quantization unit 412, a variable length coder 413 and a coarse prediction loop which includes an inverse quantization unit 414, an IDCT unit 415, a coarse frame memory 416, a motion estimation unit 417, a motion compensation unit 418 with a switch SW2 for configuring the prediction modes.

The decoder structure of this invention as shown in FIG. 5 also comprises an enhancement layer and a base layer. The enhancement layer has a bit-plane variable length decoder 501, a first IDCT unit 502, and a fine prediction loop which includes a bit-plane divider 503, a second IDCT unit 504, a fine frame memory 505 and a motion compensation unit 506 with a switch SW3 for configuring the prediction modes in the enhancement layer. The base layer has a variable length decoder 510, an inverse quantization unit 511, a third IDCT unit 512, and a coarse prediction loop which includes a coarse frame memory 513, and a motion compensation unit 514 with a switch SW4 for configuring the prediction modes in the base layer.

The principle and operation of the basic fine granularity scalable codec used in this invention have been well known and described in the prior art. The architecture of the novel FGS codec of this invention provides switches SW1, SW2, SW3 and SW4 for adaptively selecting three prediction modes to improve coding efficiency and performance. The following will describe the principles of various prediction modes and their operations.

As shown in FIG. 4, the encoder contains two switches, SW1 and SW2, for configuring the prediction modes of the two motion-compensated prediction loops in the enhancement-layer (EL) and base-layer (BL) coders, respectively. The upper switch SW1 is used to configure the prediction from either of fine and coarse memories for the motion-compensation loop at the EL coder; while SW2 is for choosing the BL's prediction mode (SW=1: fine prediction; SW=0: coarse prediction). As summarized in Table 1, three coding modes are provided in the encoder at the macroblock (MB)-level according to this invention: All-Fine Prediction (AFP: SW1=1 and SW2=1), All-Coarse Prediction (ACP: SW1=0 and SW2=0), and Mix Prediction (MP: SW1=1 and SW2=0).

According to this invention, the prediction modes of the encoder are adaptively selected for each macroblock of the input video signals by the mode selection switches SW1 and SW2 that are controlled by a mismatch estimation and mode decision unit 419 as illustrated in FIG. 4. Both best-case and worst-case estimates of mismatch errors are computed in the mismatch estimation and mode decision unit 419 for making mode decision. Therefore, in addition to the best-case coarse prediction output from the motion compensation unit 418, a worst-case coarse prediction output $PX_{BL2}{}^{i}$ is also provided by a worst-case base-line decoder 420. The method for adpatively selecting the prediction modes will be described in detail later.

One or two variable length coded (VLC) bits per MB are sent to the decoder to signal the prediction mode used. These coding modes have different characteristics in terms of coding efficiency and error robustness. If the AFP mode is selected, both BL and EL exploit predictions from the fine frame memory, leading to the highest coding efficiency. This, however, runs a high risk of introducing drifting error because the receivers may not be able to completely receive the EL bit-planes used in the fine predictions due to insufficient channel bandwidth or packet losses. As a whole, the operations in this mode are very similar to the one-loop motion-compensated FGS (MC-FGS). On the contrary, same as the baseline FGS, the ACP mode uses coarse predictions for both BL and EL. This mode guarantees no drifting error should the base-layer bitstream be received completely but its coding efficiency is the lowest among the three modes. The MP mode compromises on the coding efficiency and error robustness. It adopts fine predictions for the EL and coarse predictions for the BL, respectively. With this mode, drifting error may occur at the EL when part of EL bit-planes used for fine predictions is lost; while the BL can be drift-free under the assumption that the decoder receives the whole BL data.

Figure 6:
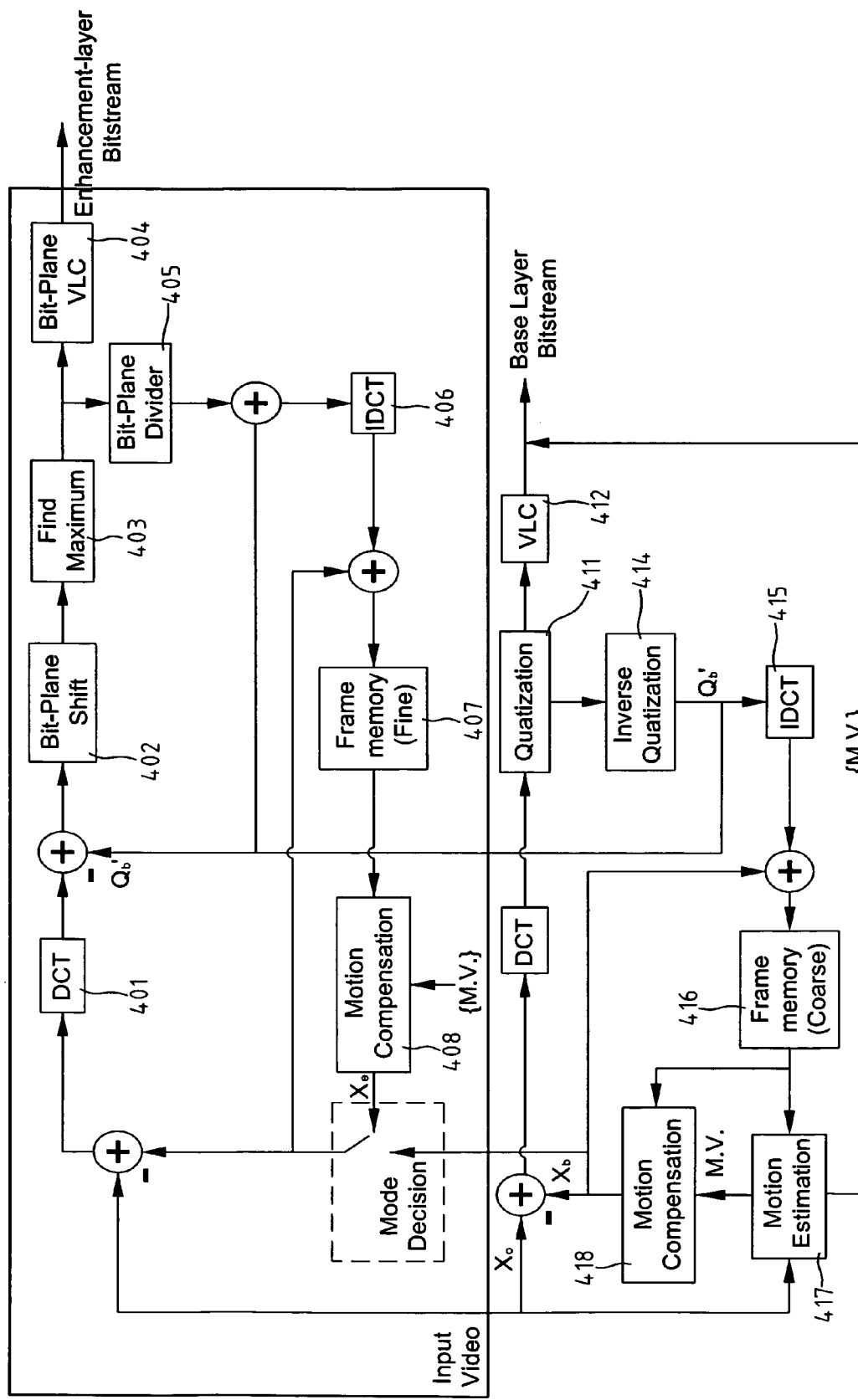
FIG. 6 shows the encoder structure of the novel FGS codec with inter-layer prediction in which the base layer only has coarse prediction according to the present invention.
Figure 7:
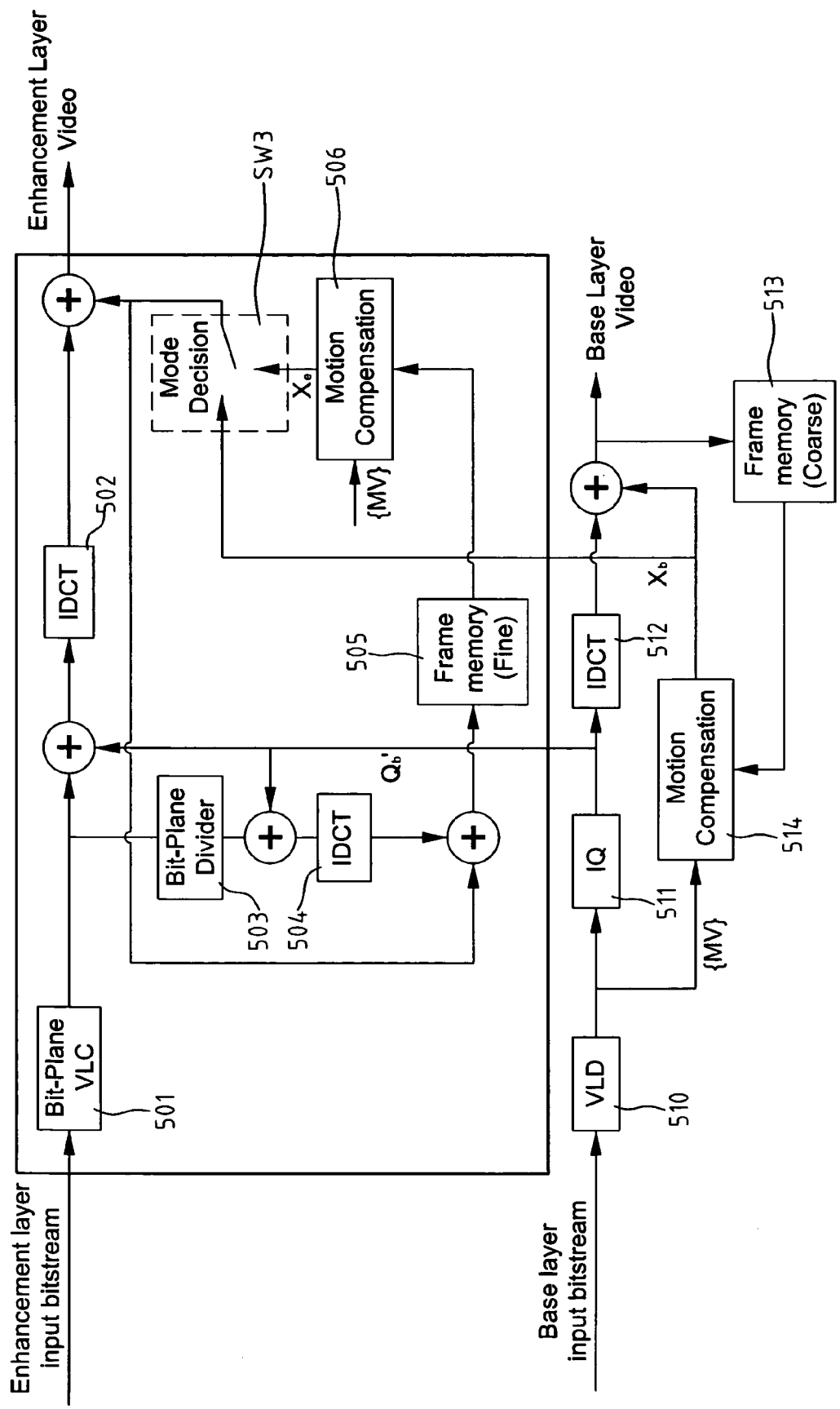
FIG. 7 shows the decoder structure of the novel FGS codec with inter-layer prediction in which the base layer only has coarse prediction according to the present invention.

In addition to the novel three-mode FGS codec, as a special case of the three-mode codec, another simplified FGS codec with only MP and ACP coding modes reduces the drift while sacrificing some coding gain introduced by the AFP coding mode. Without the AFP coding mode, the new codec reduces to the coder and decoder architectures shown in FIGS. 6 and 7, respectively. This two-mode version is referred to as the "low-drift" mode, in contrast to the "high-gain" mode for the three-mode version. In this new codec, the overhead of sending the coding mode is reduced to one bit per MB. Table 1 summarizes the prediction modes used in the codec of this invention.

TABLE 1

Three prediction modes used in the FGS coding scheme of this invention

| Prediction Modes | VLC Code | Description |
| --- | --- | --- |
| All-Coarse Prediction (SW1 = 0 and SW 2 = 0) | Low-drift: 1 High-gain: 10 | Coarse prediction is used for both the base and enhancement layers. Same with original FGS. Strong error resiliency, but less coding efficiency |
| All-Fine Prediction (SW1 = 1 and SW 2 = 1) | Low-drift: N.A. High-gain: 10 | Fine prediction is used for both the base and enhancement layers. Same with one-loop MC-FGS. Highest coding efficiency, but sensitive to drift errors. |
| Mix Prediction (SW1 = 1 and SW 2 = 0) | Low-drift: 0 High-gain: 0 | Fine prediction is used for the enhancement-layer and coarse prediction for the base layer. Same with PFGS. Limit the drifting error at the base layer, and achieve higher coding efficiency at high bit-rate than "Original FGS" |

According to this invention, to avoid performing motion re-estimation and sending one extra motion vector for each MB, the motion vectors obtained from the BL encoder are reused for the motion-compensation operation at the EL coder. However, the BL motion vectors may not be optimal for encoding the EL bitstream.

As discussed above, encoding with the coarse prediction (i.e., the ACP mode) is usually less efficient than that with the fine prediction (i.e., the AFP and MP modes), while drifting error may occur if the fine prediction is utilized but some of EL bit-planes used for prediction are not received by the decoder. This invention develops a statistical approach to estimating the best choice of prediction mode when the user bit-rates are unknown prior to the encoding.

Figure 8:
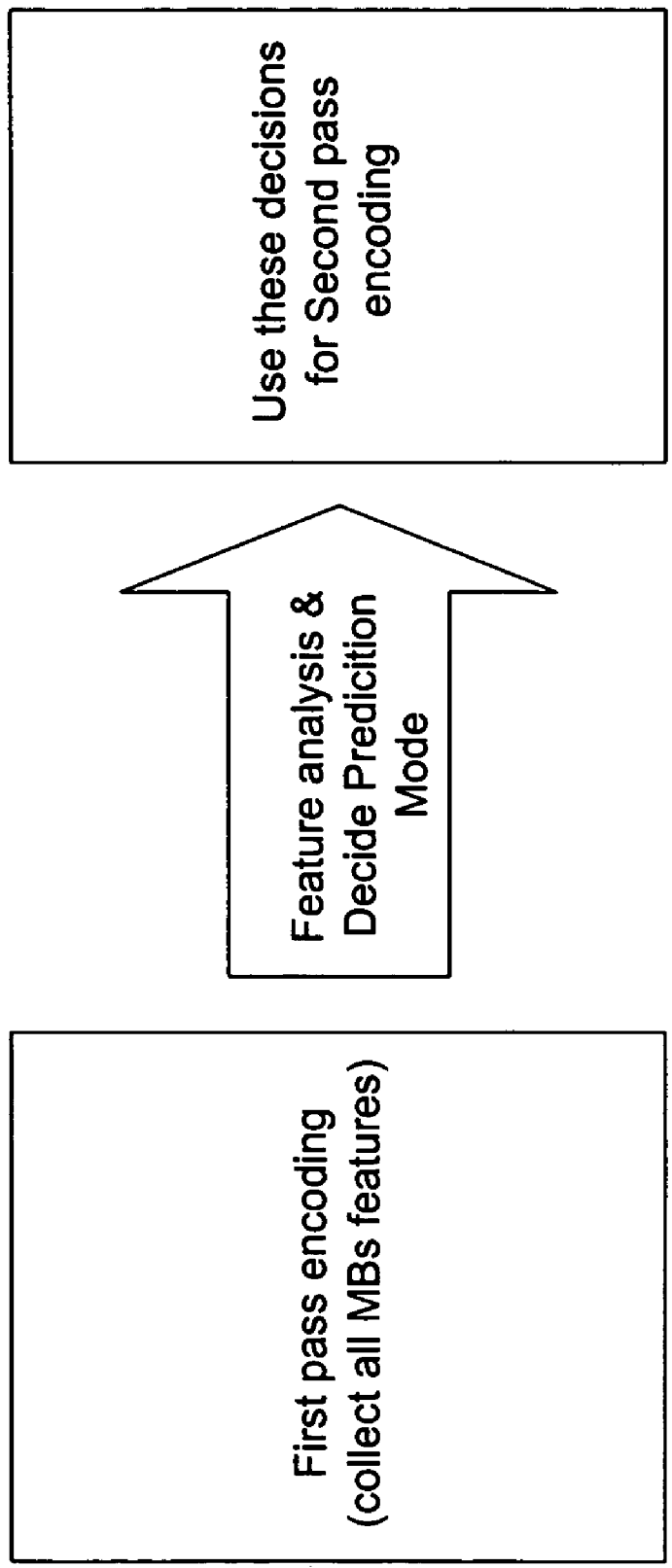
FIG. 8 shows the two-pass encoding procedure of this invention.

As illustrated in FIG. 8, a two-pass encoding procedure is adopted in this invention. While performing the first-pass encoding, the encoding parameters of all MBs are collected, including the prediction error values with the fine and coarse predictions, respectively, and the estimated mismatch error introduced with the fine prediction in the case that the EL data used for prediction cannot be received at the decoder. Among these parameters, the difference between the prediction error values of the two predictions reflects their coding gain difference, while the mismatch error will result in error propagation to the subsequent frames. For example, the coding gain with the fine prediction can be significantly higher than that with the coarse one, which can be estimated as the difference between the fine and coarse prediction errors of the as follows:

$$G_i = \sum_{m=0}^{15}\sum_{n=0}^{15} (\|X_{in}^i(m,n) - PX_{BL1}^i(m,n)\| - \|X_{in}^i(m,n) - PX_{EL}^i(m,n)\|) \quad (1)$$

where $X_{in}^i$ stands for the ith incoming MB; $PX_{BL}^i$ and $PX_{EL}^i$ represent the associated coarse and fine predictions of $X_{in}^i$, respectively. Note, the two norms in Eq. (1) represent the energy values (e.g., the magnitudes) of the two prediction errors with the fine and coarse prediction modes, respectively. A large $G_i$ value for one MB implies that the fine prediction is much more accurate than the coarse one.

However, the coding gain comes with the risk of introducing drifting error because the fine prediction adopts part of EL data which may not be completely received at the decoder due to insufficient bandwidth or packet loss. In order to capture such drifting effect, the following two mismatch estimates are evaluated:

$$D_i^B = \sum_{m=0}^{15}\sum_{n=0}^{15} \|PX_{BL1}^i(m,n) - PX_{EL}^i(m,n)\| \quad (2)$$

$$D_i^W = \sum_{m=0}^{15}\sum_{n=0}^{15} \|PX_{BL2}^i(m,n) - PX_{EL}^i(m,n)\| \quad (3)$$

where $D_i^B$ and $D_i^W$ stand for the best-case and worst-case estimates of mismatch errors, respectively, under the assumption of zero motion-vector error concealment being used. $PX_{BL2}^i$ is the coarse prediction from another BL coder which encoded at the base-layer bit-rate (i.e., without receiving any EL bits). The mismatch estimates indicate the bounds of concealment error. The best-case estimate $D_i^B$ evaluates the lower bound of mismatch error since it assumes all the BL data in previous frames are received correctly. In contrast, the worst-case estimate $D_i^W$ is to calculate the accumulated drift should the decoder have only the base-layer (lowest) bandwidth. These two measures can be used to characterize the effect of drifting error, since they reflect the difference between the two frame memories of encoder and decoder. A MB with a large mismatch value implies that it is likely to result in more drifting error if lost.

Note that it is impossible to accurately estimate the actual mismatch while encoding without the knowledge about the channel bandwidths and conditions of client decoders. However, it is known that the actual mismatch error is bounded by these two estimates, that is, $D_i^B \leq D_i \leq D_i^W$. This invention uses the weighted average of these two estimates to predict the actual mismatch error:

$$PD_i = k_D D_i^B + (1-k_D) D_i^W \qquad (4)$$

where $k_D \in [0,1]$. The selection of $k_D$ is dependent on the distribution of decoder bandwidth.

In order to determine the coding mode of each MB so as to achieve good coding performance while keeping enough error robustness, a new index: "Coding gains Over Drifting Error" (CODE) is introduced:

$$CODE_i = G_i/PD_i \qquad (5)$$

where $G_i$ and $PD_i$ are obtained from Eqs. (1) and (4), respectively. The index in Eq. (5) can be used to characterize the relative gain of coding performance improvement over the potential drifting error for a MB coded with fine prediction. A large CODE value of a MB implies a high possibility that using the fine-prediction to encode the MB can achieve high coding gain while the potential drift penalty is not serious.

After extracting the features for all the MBs in one video frame, the mean and standard deviation of the "CODE" values, $m_{CODE}$ and $\sigma_{CODE}$, are calculated as follows:

$$m_{CODE} = \frac{1}{N_{MB}} \sum_{i=1}^{N_{MB}} CODE_i \qquad (6)$$

$$\sigma_{CODE} = \sqrt{\frac{1}{N_{MB}} \sum_{i=1}^{N_{MB}} (CODE_i - m_{CODE})^2} \qquad (7)$$

where $N_{MB}$ is the number of MBs in a frame.

The MBs are then classified into three groups which are encoded with distinct prediction modes (i.e., the ACP, AFP, and MP modes) using the two parameters as follows:

$$MODE_i = \begin{cases} ACP & \text{if } CODE_i < m_{CODE} - k\sigma_{CODE} \\ AFP & \text{if } CODE_i > m_{CODE} + k\sigma_{CODE} \\ MP & \text{otherwise} \end{cases} \qquad (8)$$

Figure 9:
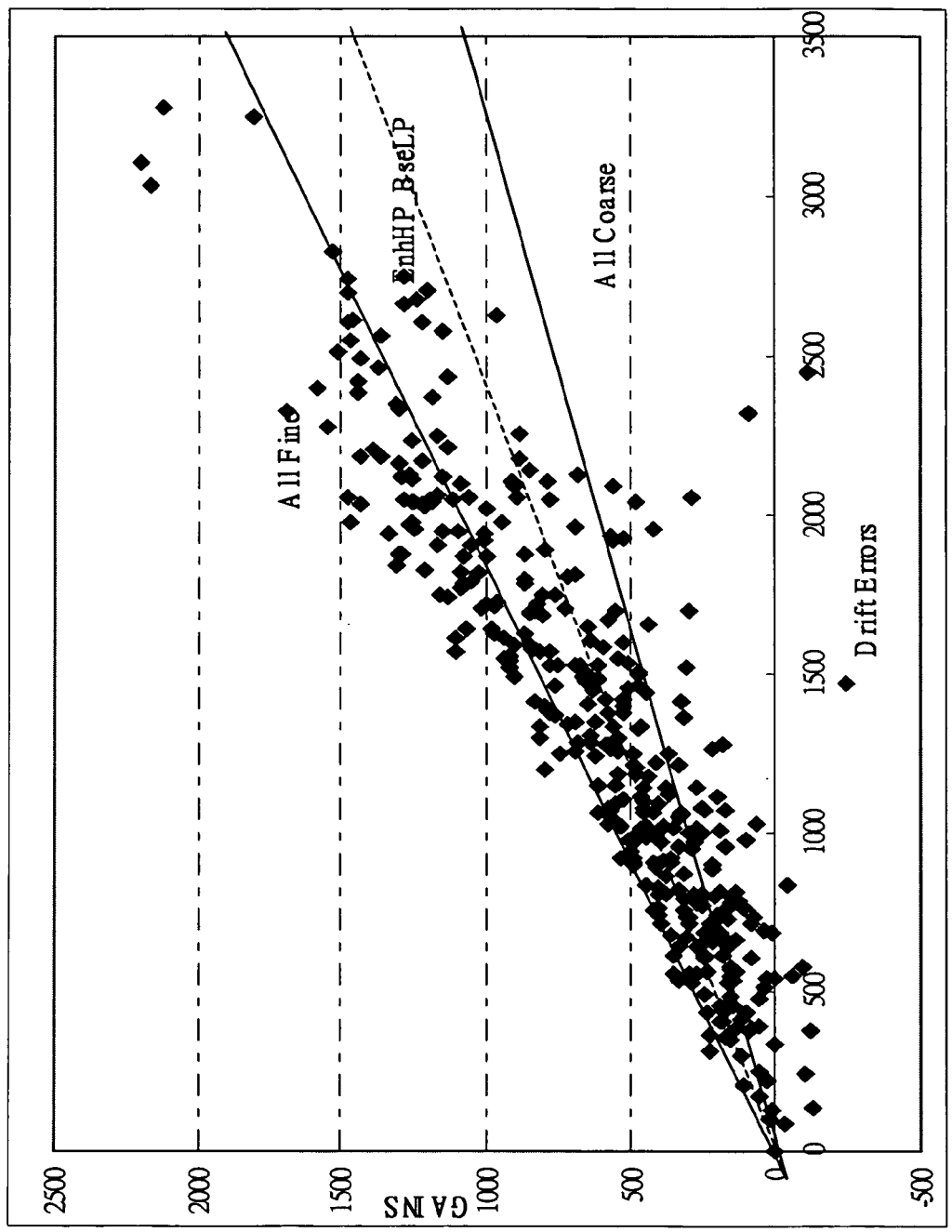
FIG. 9 shows an example distribution and the relationship between the estimated mismatch errors and coding gains for a number of MBs.

FIG. 9 illustrates an example distribution of pairs of mismatch and coding gain for a number of MBs. The X-axis and Y-axis indicate the values of coding gain as defined in Eq. (1) and the mismatch error as in Eq. (4), respectively. The higher X-axis value states that the fine prediction is more beneficial for this MB by introducing more bits into the fine frame memory. In the case of adapting extra bits, the coding gain accompanies the drifting error. Each spot on FIG. 9 stands for the (G,D) pair of one MB located in each category. The upper and lower solid straight lines represent (G,D) pairs with the CODE values of "$m_{CODE} + k\sigma_{CODE}$" and "$m_{CODE} - k\sigma_{CODE}$" (k=1 in this case), respectively; while the broken lines between them represent those with the value of $m_{CODE}$. Those MBs with (G,D) positions above the upper solid line are encoded with the AFP mode since this is expected to be likely to achieve significantly higher coding performance, while the drifting error introduced is not that serious if the decoder does not receive some of EL packets used for prediction. On the contrary, the MBs with (G,D) positions under the bottom solid line are encoded with the ACP mode since they are more sensitive to drifting error. The remaining MBs are encoded with the MP mode to achieve a better tradeoff between the coding gain and drifting error.

Because P-frames are used as the references for encoding the following B/P-frames, the prediction mode decision method of this invention is applied to P-frames. Moreover, B-frames will not be used as predictions for other frames, the drifting error will not propagate to other frames. Therefore the fine predictions are used aggressively to encode all MBs in B-frames.

While streaming, the streaming server truncates each EL frame to an appropriate size to fit the channel bandwidth of the client terminal. If the fine prediction is used for encoding the BL and EL, the bit-allocation scheme for truncating the FGS EL frames can influence the performance largely. For example, if reasonably more bits can be allocated to I/P-frames than B-frames, the decoder will be likely to receive more bit-planes of I/P-frames, leading to lower drifting error and higher video quality. In addition, B-frames can also reference to better-quality pictures for prediction at the encoder as well as for reconstruction at the decoder should more EL bit-planes of the reference pictures used for prediction be received.

In this invention, a new rate adaptation algorithm is presented for truncating the EL bit-planes at the video server with three different cases of available bandwidths: low bit-rate, medium bit-rate, and high bit-rate. In the low bit-rate case, the available bandwidth is not sufficient to send all the EL bit-planes of I/P-frames used for the fine-predictions of both layers during the encoding process. Therefore, drifting error is inevitable when part of the EL data used for prediction is dropped in the truncation process. On the other hand, if the available bandwidth is high enough to send all the EL bit-planes used for fine-predictions, but is less than the bit-count of $N_{BP}$ EL MSB bit-planes of all B-frame in a group of pictures (GOP), the excessive bits will be distributed among B-frames to balance the picture quality between I/P- and B-frames. Moreover, if the channel condition is even better, the surplus of bits will also be allocated among I/P-frames while the related bits are reserved to avoid drifting error. Such bit-rate adaptation by truncating the EL bit-planes can be performed at the server or routers. The truncation schemes for different cases are elaborated separately below. Table 2 describes the parameters used in the server bit-plane truncation algorithm of this invention.

TABLE 2

Parameters used for server rate adaptation

| Parameter | Description |
| --- | --- |
| $N_{Gop}$ | the GOP size |
| $N_{I\&P}$ | the number of I- and P-frames in a GOP |
| $N_B$ | the number of B-frames in a GOP ($N_B = N_{GOP} - N_{I\&P}$) |
| | Pre-encoding at the encoder |
| $N_{BP}$ | number of bit-planes used for fine predictions while encoding |
| $PB_{EL}$ | total number of EL bits in a GOP used for fine predictions |
| $PB_{I\&P,EL}$ | number of EL bits in all I- and P-frames in a GOP used for the fine prediction |
| $PB_{B,EL}$ | bit-count of $N_{BP}$ EL MSB bit-planes of all B-frame in a GOP |
| $PB_{I\&P,EL}^n$ | number of EL bits in the nth I/P-frames in a GOP used for fine predictions |
| $PB_{B,EL}^m$ | bit-count of $N_{BP}$ EL MSB bit-planes of the mth B-frame in a GOP |

TABLE 2-continued

Parameters used for server rate adaptation

| Parameter | Description |
|---|---|
| | Parameters of bit-plane truncation at the server |
| $TB_{EL}$ | bit-allocation of truncation for the EL in a GOP |
| $TB_{I\&P,EL}^n$ | bit-allocation of truncation for the nth I/P-frames of EL in a GOP |
| $TB_{B,EL}^m$ | bit-allocation of truncation for the mth B-frame of EL in a GOP |

Case 1: Low Available Bandwidth

In this case, the available channel bandwidth estimated at the server is less than the amount of EL bits of I- and P-frames used for the fine predictions while encoding. Since the available bandwidth is not sufficient to send all the bits used in fine prediction, this invention truncates the enhancement layers as much as possible for I- and P-frames. The truncation scheme for each I/P frame is adapted according to the number of bits used for prediction in each frame as follows:

$$TB_{I\&P,EL}^n = PB_{EL} \times \frac{PB_{I\&P,EL}^i}{\sum_{n=1}^{N_{I\&P}} PB_{I\&P,EL}^i} \quad (9)$$

In this case, the bit-allocation for B-frames are all set to be zero, that is, $TB_{B,EL}^m = 0$, m=1, 2, ..., $N_B$. Eq. (9) is used if the current bit budget is less then $PB_{I\&P,EL}$. The bit-allocation is made only for I- and P-frames, while the EL data of B-frames are all dropped in truncation in this case. This strategy can achieve more robust performance at low bit-rates.

Case 2: Medium Available Bandwidth

If the available bandwidth is sufficient for sending all the EL bits of I- and P-flames used for fine prediction, but is less than $PB_{B,EL}$, the server starts to distribute the excessive bits to B-flames after the bit-allocations to I/P-frames can guarantee the bit-planes of I/P-flames used for fine-prediction be completely sent to the receiver.

Case 3: High Available Bandwidth

If the available bandwidth is higher than that required for sending the number of EL bit-planes used for the fine prediction, the number of bits for distribution is controlled by the size of bit-planes and varies at particular bit-rates. However, when the bit-rate increases rapidly, there exists a large variation between two neighboring frames if no more bits are allocated to I/P-frames. Therefore, the distributed bit-allocations among frames should be balanced to avoid large quality variations.

The EL bit-allocation algorithm according to this invention is summarized with a pseudo program below:

EL Bit-Allocation Algorithm

Begin:
  if ($TB_{EL} \leq P_{I\&P,EL}$) /* perform low-rate bit truncation */

$$TB_{I\&P,EL}^n = PB_{EL} \times \frac{PB_{I\&P,EL}^n}{\sum_{n=1}^{N_{I\&P}} PB_{I\&P,EL}^n}, n = 1, 2, \ldots, N_{I\&P};$$

$TB_{B,EL}^m = 0, m = 1, 2, \ldots, N_B;$

-continued

EL Bit-Allocation Algorithm else if ($TB_{EL} \leq PB_{EL}$) /* perform medium-rate bit truncation */

$TB_{I\&P,EL}^n = PB_{I\&P,EL}^n, n = 1, 2, \ldots, N_{I\&P};$ $$TB_{B,EL}^m = PB_{B,EL} \times \frac{PB_{B,EL}^m}{\sum_{m=0}^{N_B} PB_{B,EL}^m}, m = 1, 2, \ldots, N_B;$$

else /* perform high-rate bit truncation */

$$TB_{I\&P,EL}^n = PB_{I\&P,EL}^n + PB_{B,EL} \times \frac{PB_{I\&P,EL}^n}{\sum_{n=0}^{N_{I\&P}} PB_{I\&P,EL}^b + \sum_{m=0}^{N_B} PB_{B,EL}^m};$$

$$TB_{B,EL}^m = PB_{B,EL} \times \frac{PB_{B,EL}^m}{\sum_{n=0}^{N_{I\&P}} PB_{I\&P,EL}^n + \sum_{m=0}^{N_B} PB_{B,EL}^m};$$

endif
End

The simulation results show the effectiveness of the codecs of the present invention. Two test sequences, "Coastguard" and "Mobile," are used in the experiments. The sequence is encoded with the (30,2) GOP structure. The BL is encoded at 384 kbps with the TM5 rate control scheme and 30 fps frame rate. The frame size is CIF 352×288. Two EL bit-planes are used in the fine prediction (i.e., the AFP and MP modes).

Figure 10:
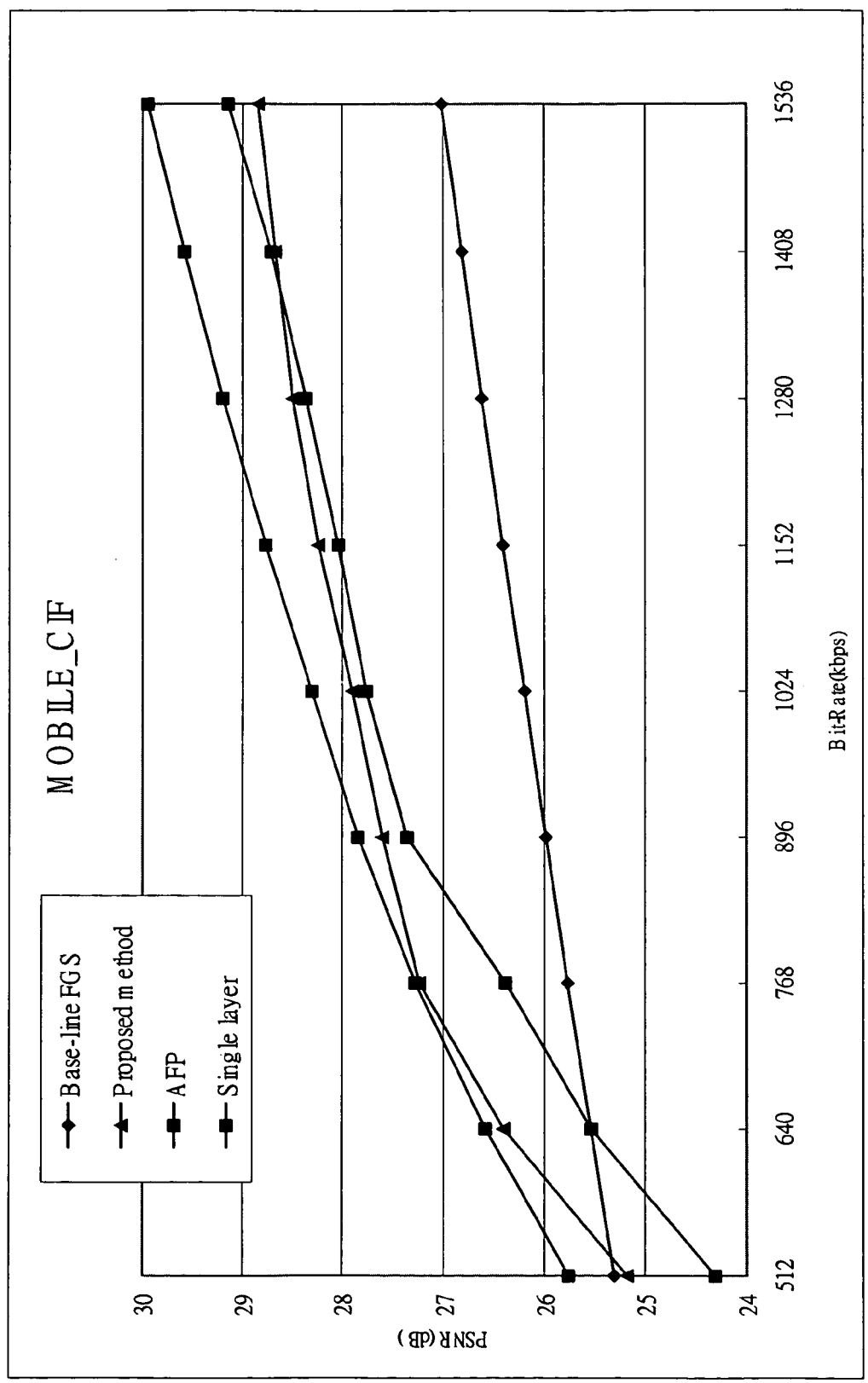
FIG. 10 shows the performance comparison of the method of this invention to three other conventional methods using Mobile test sequence.
Figure 11:
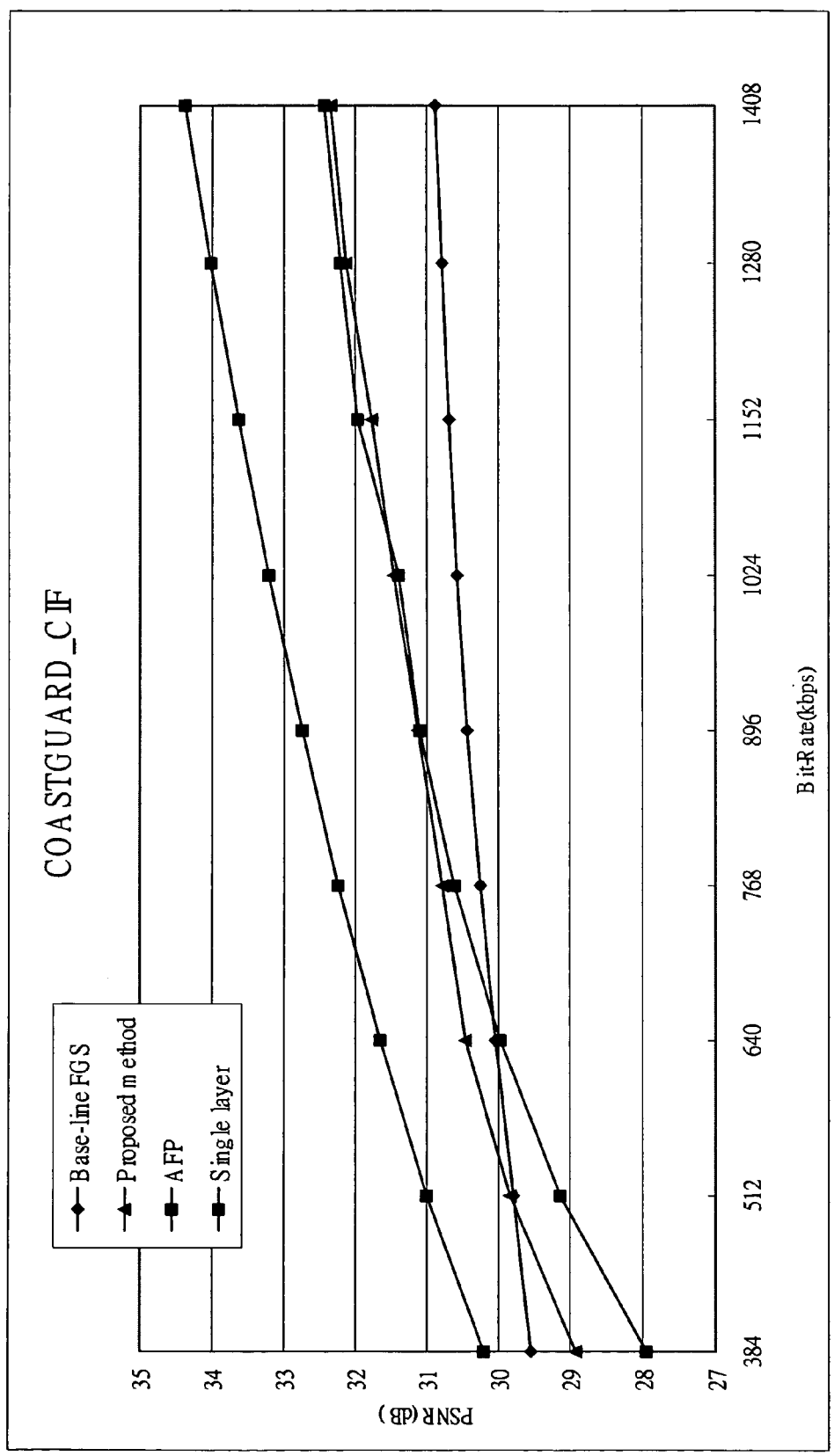
FIG. 11 shows the performance comparison of the method of this invention to three other conventional methods using Coastguard test sequence.

FIGS. 10 and 11 show the performance comparison of the method of this invention with three other methods: the baseline FGS, all-fine prediction (AFP), and the single-layer MPEG-4 codec for the two test sequences. The simulation results show that the method of this invention outperforms the other three mechanisms in a wide range of bit-rates. The AFP and the baseline FGS schemes represent two different critical bounds of quality at the highest and lowest bit-rate ranges, respectively. The purpose of the method of this invention is to find good tradeoffs between the two methods at a wide bit-rate range. This goal is achieved by adaptively introducing a predefined number of bit-planes into the motion-compensated prediction of the BL, while slight quality degradation due to the drifting error is observed at a small range of low bit-rates (384-512 Kbps). The method of this invention is much more robust than "All-Fine" prediction.

The AFP method is applied to all B-frames which can improve the coding efficiency significantly without causing error propagation. The motion vectors are obtained using the high quality predictions. The "Inter-Layer Selection" scheme is implemented for P-frames to improve the coding efficiency at the BL and the reference frames of motion compensation may be different at both layers with the same motion information. Two sets of motion vectors for the BL and EL are not desirable because it needs much more computations and extra bit-rates for estimating and sending the extra set of motion vectors. The motion vector estimated at the BL is reused for the motion compensation at the enhancement-layer. The "All-fine" prediction suffers from about 1 dB loss when the bit rate is low. With the present invention, the quality degradation due to the drifting error at low bit-rates can be reduced significantly, while the coding gains achieved is about 1~1.5 dB than original FGS at high bit-rates.

Figure 12A:
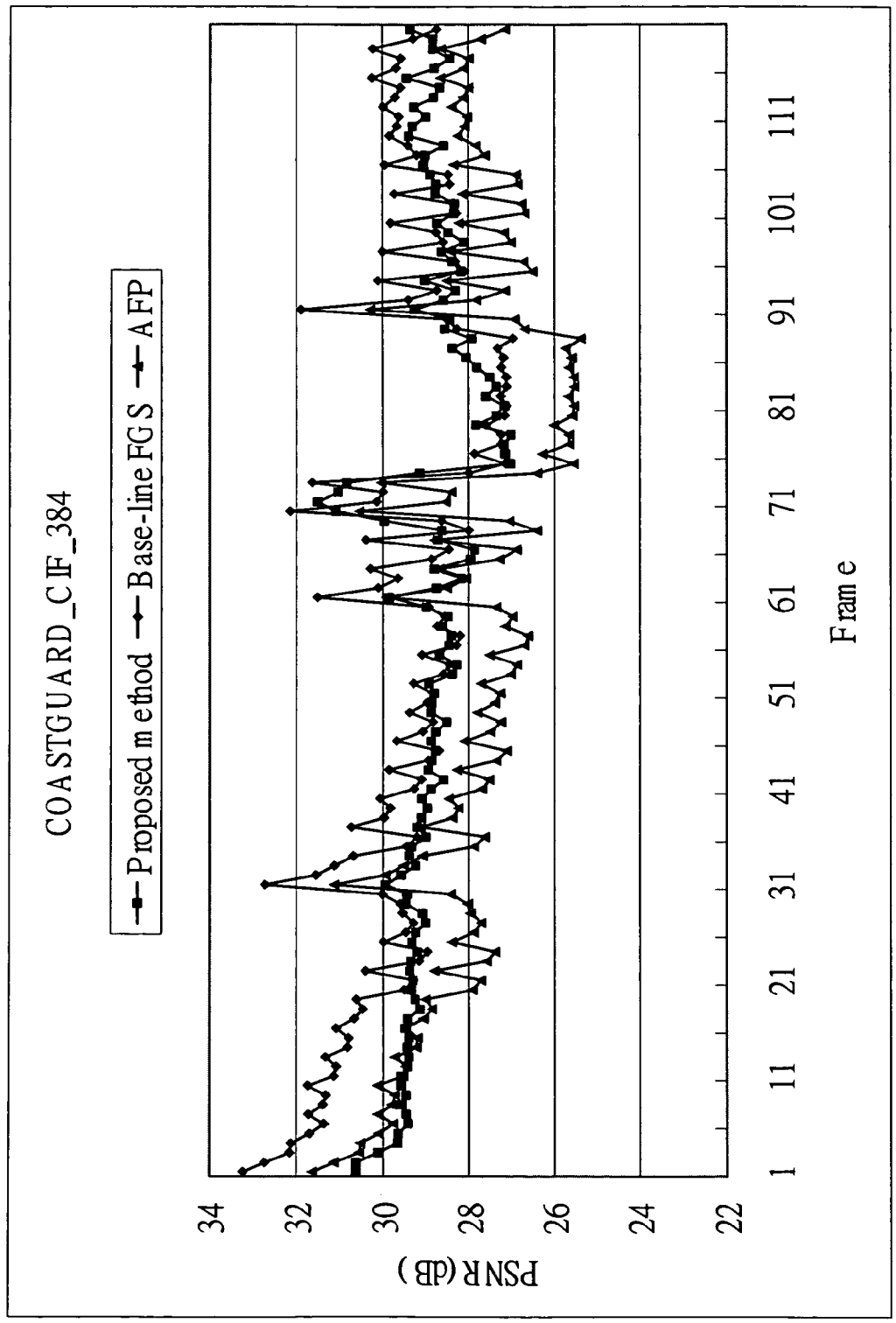
FIG. 12 shows the frame-by-frame performance comparison of the method of this invention to three other conventional methods using Coastguard test sequence with a base-layer bit-rate of 384 kbps and an enhancement layer bit-rate of (a) 0 kpbs, (b) 256 kbps and (c) 768 kbps respectively.
Figure 12B:
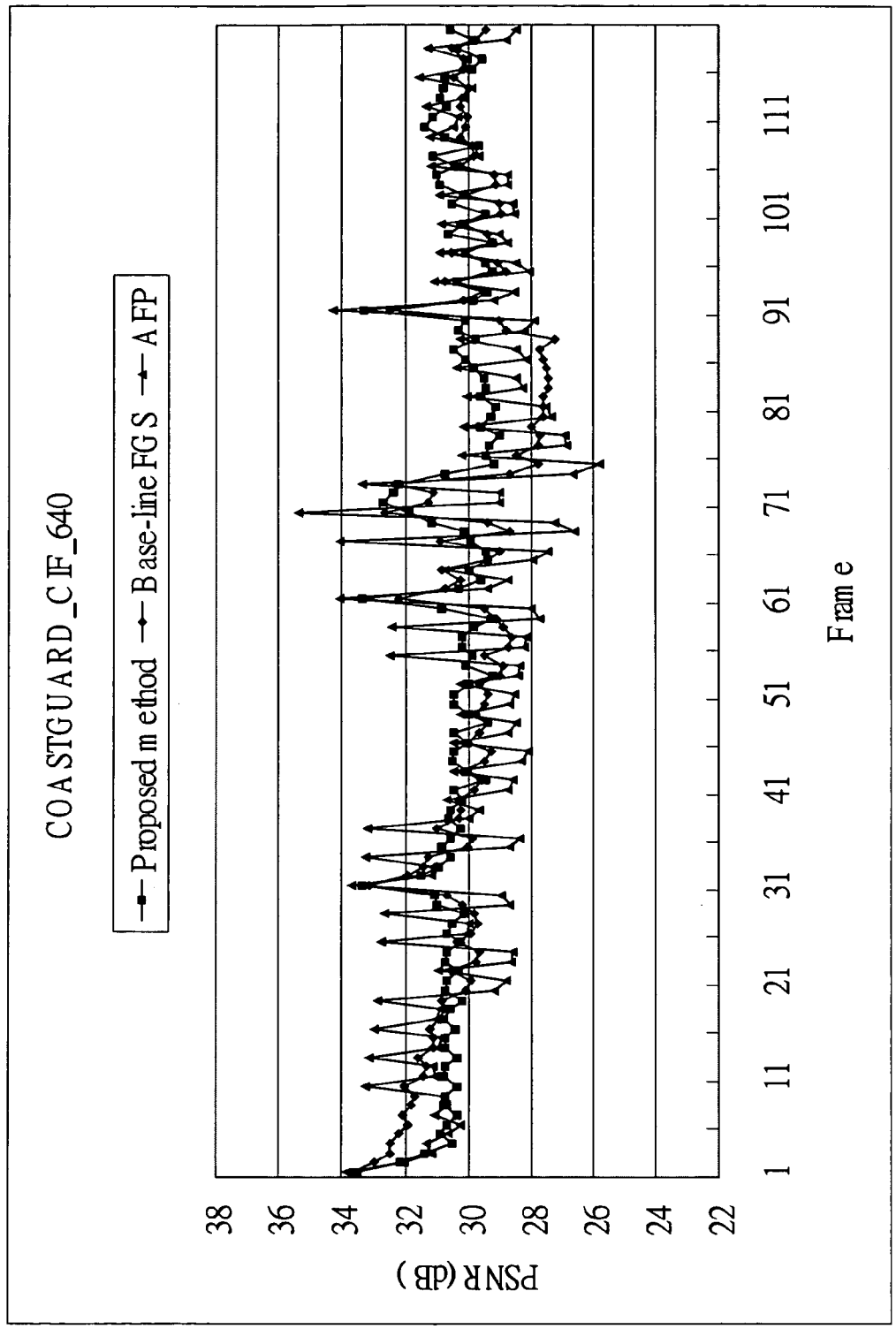
Figure 12C:
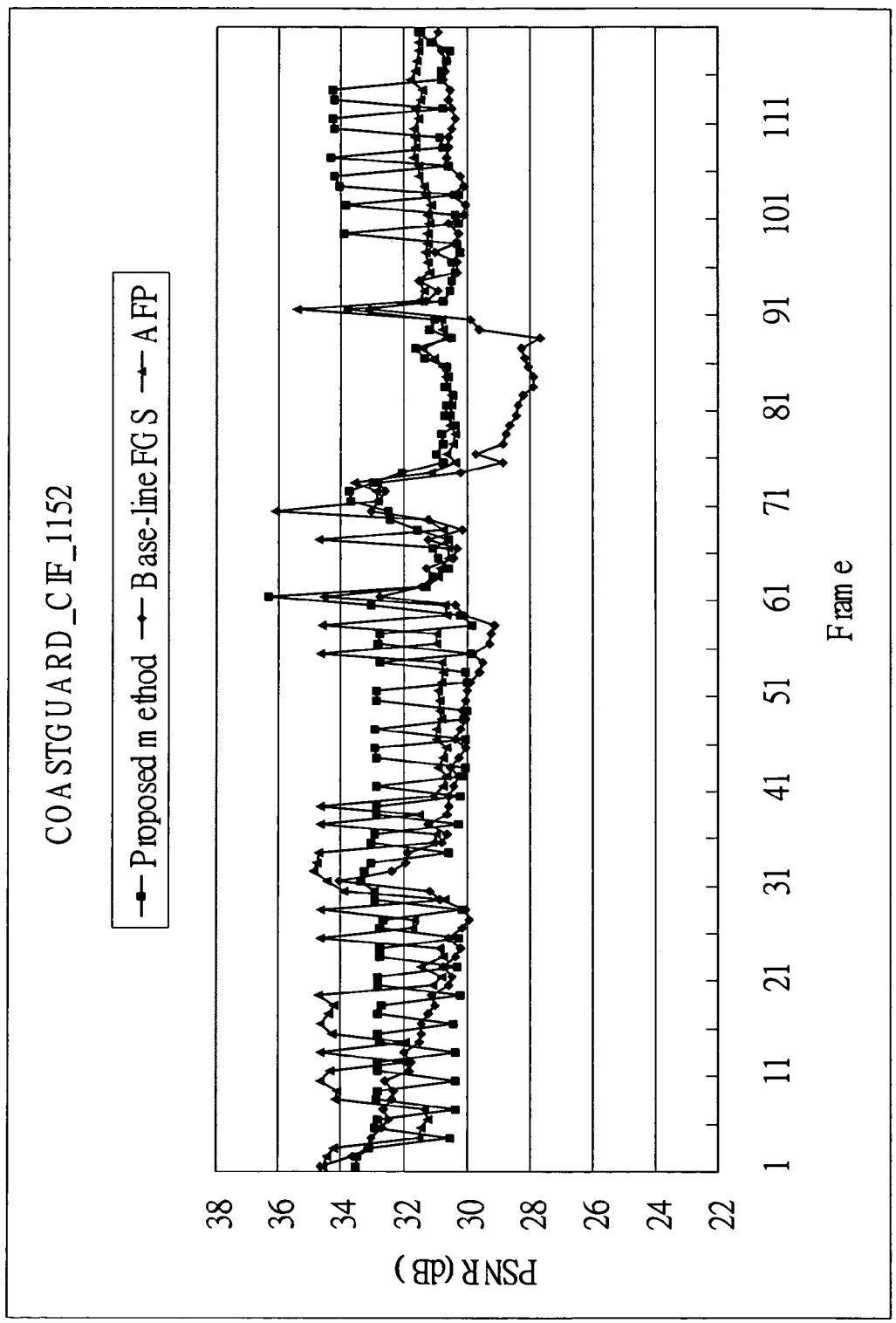
Figure 13A:
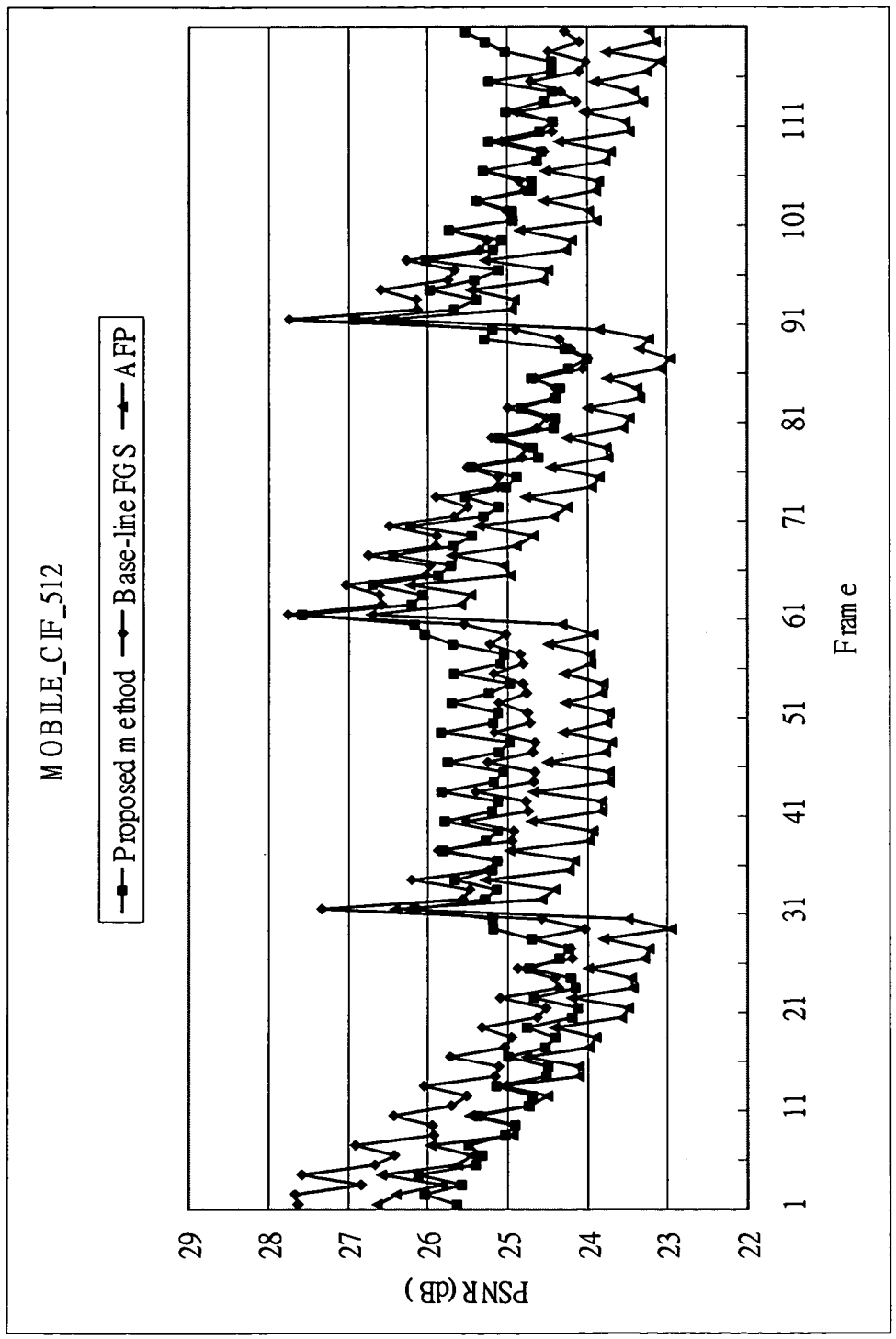
FIG. 13 shows the frame-by-frame performance comparison of the method of this invention to three other conventional methods using Mobile test sequence with a base-layer bit-rate of 512 kbps and an enhancement layer bit-rate of (a) 0 kpbs, (b) 256 kbps and (c) 768 kbps respectively.
Figure 13B:
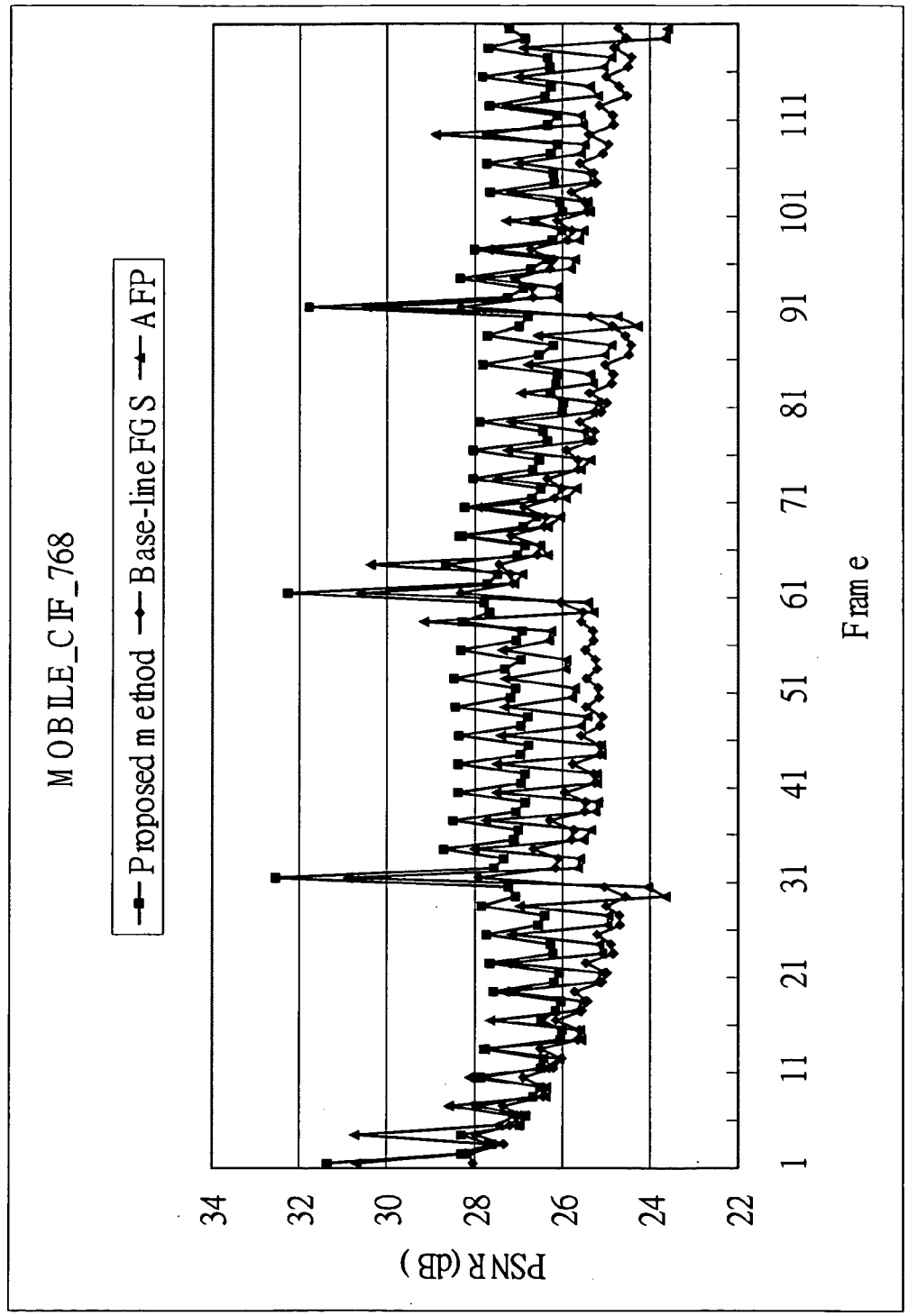
Figure 13C:
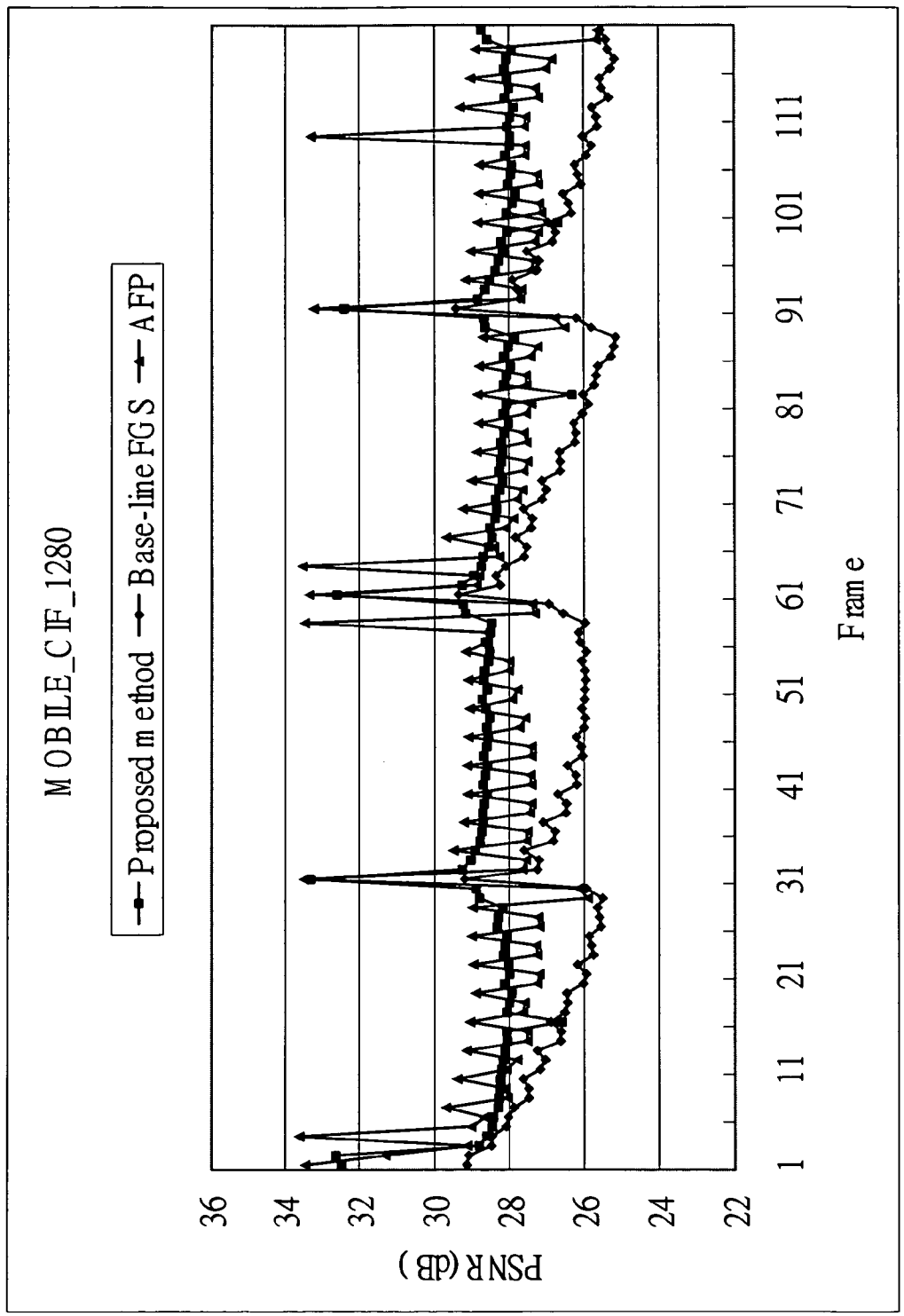
Figure 14A:
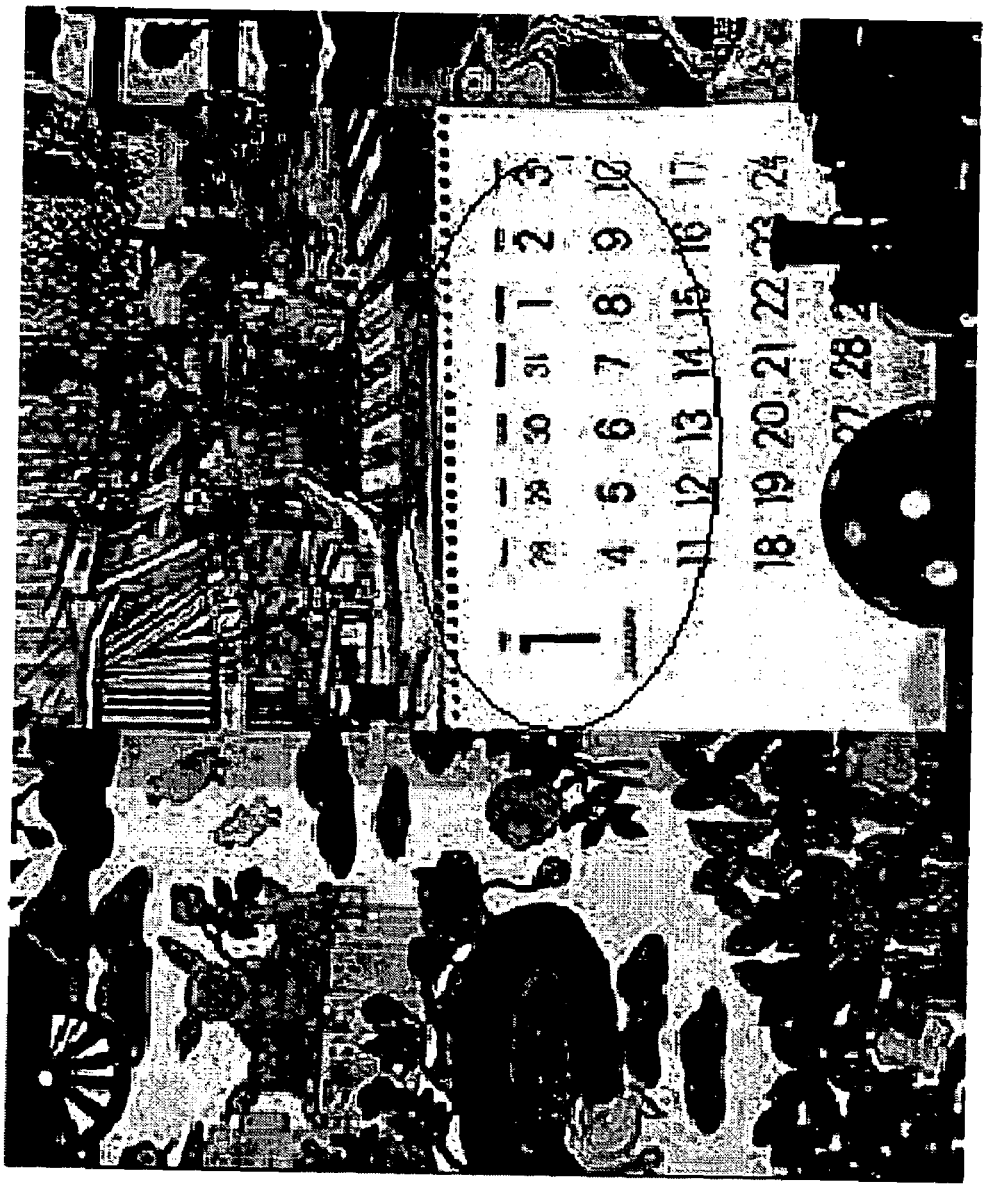
FIG. 14 shows the $4^{th}$ decoded picture with 512 kbps at base layer and 512 kbps at enhancement layer by (a) the original FGS encoder (27.5 dB) and (b) the Hybrid MB-MSFGS method of this invention (32.4 dB).
Figure 14B:
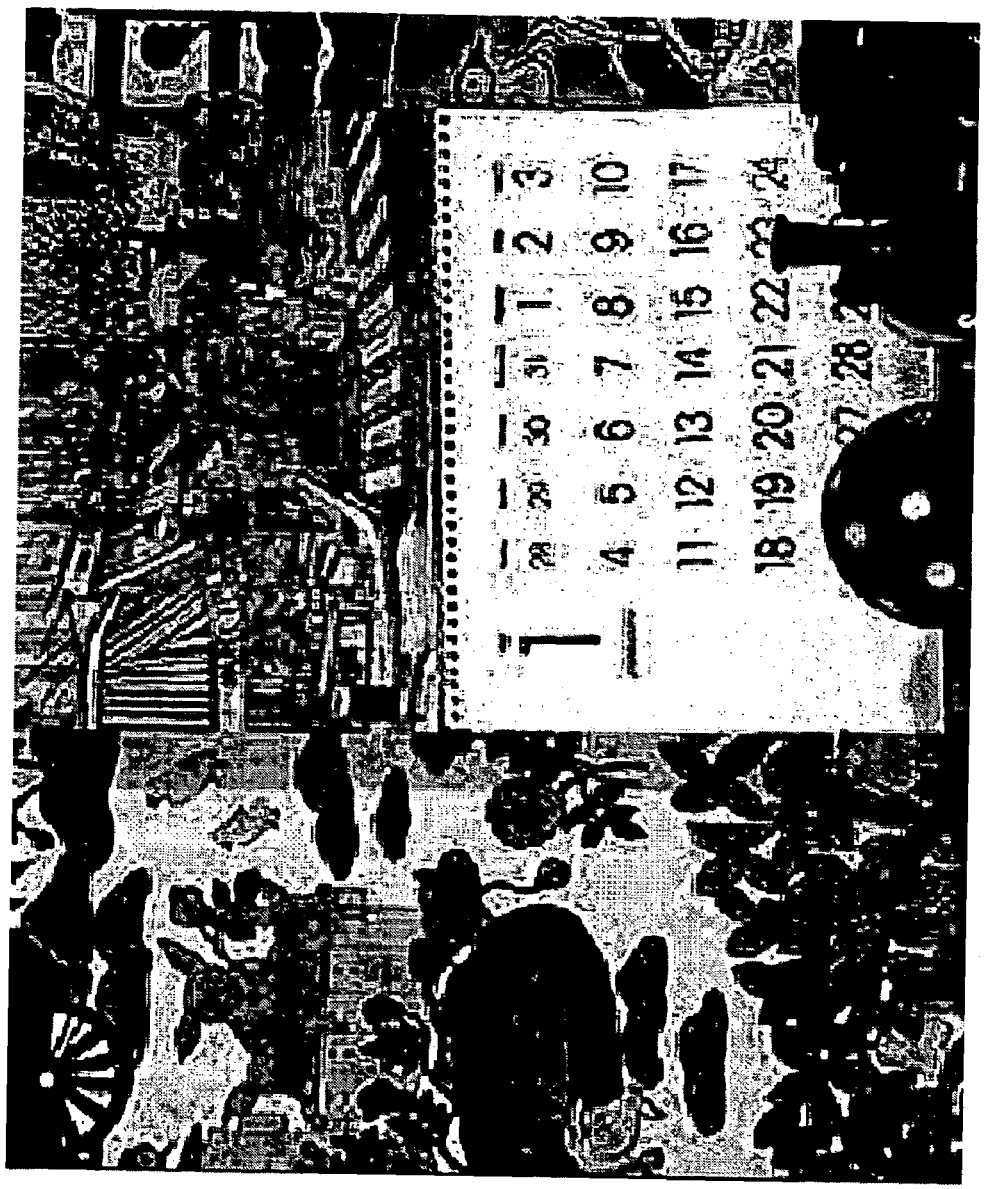

FIGS. 12 and 13 show the frame-by-frame PSNR performance comparison with a base-layer bit-rate of 384 kbps for the "Coastguard" and "Mobile" sequences, respectively, and three different EL bit-rates: 0 kbps, 256 kbps, and 768 kbps. The scheme of this invention can reduce the drifting error more efficiently than the AFP scheme when the available bandwidth is low, while keeping the coding efficiency close to the AFP method when the available bandwidth is high. The scheme achieves significant higher PSNR quality improvement than the original FGS. FIG. 14 shows two decoded pictures using the present invention and the original FGS schemes for subjective performance comparison.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fine granularity scalable encoder comprising:
    a base-layer encoding block including a coarse prediction loop and a base-layer mode selector, said coarse prediction loop having a coarse prediction output;
    an enhancement-layer encoding block including a fine prediction loop and an enhancement-layer mode selector, said fine prediction loop having a fine prediction output; and
    a mode decision unit for adaptively controlling said enhancement-layer and base-layer mode selectors;
    wherein said encoder operates in a mix prediction mode when said base-layer mode selector is switched to select said coarse prediction output and said enhancement-layer mode selector is switched to select said fine prediction output, said encoder operates in an all-coarse prediction mode when both said base-layer mode selector and said enhancement-layer mode selector are switched to select said coarse prediction output, and said encoder operates in an all-fine prediction mode when both said base-layer mode selector and said enhancement-layer mode selector are switched to select said fine prediction output.

2. The fine granularity scalable encoder as claimed in claim 1, said mode decision unit further comprising a mismatch estimation unit for estimating mismatch errors between said said coarse prediction output and said fine prediction output.

3. The fine granularity scalable encoder as claimed in claim 2, further comprising a worst-case base-layer decoder for providing a worst-case coarse prediction output to said mismatch estimation unit.

4. An encoding method having at least two coding modes, said method comprising the steps of:
    (a) collecting encoding parameters from each macroblock of a plurality of macroblocks of input signals;
    (b) analyzing said encoding parameters to determine a coding mode for each macroblock; and
    (c) encoding each macroblock according to the coding mode determined in said step (b);
    wherein said encoding method includes a base layer with coarse prediction and an enhancement layer with fine prediction, and encoding parameters collected from each macroblock in said step (a) include a fine prediction error value, a coarse prediction error value, and best-case and worst-case mismatch errors in fine prediction.

5. The encoding method as claimed in claim 4, wherein said plurality of macroblocks are classified in said step (b) into at least two coding groups and each macroblock in a coding group is assigned with a same coding mode.

6. The encoding method as claimed in claim 4, wherein said encoding method has an all-coarse prediction mode, an all-fine prediction mode, and a mix prediction mode, and said plurality of macroblocks are classified in said step (b) into an all-coarse prediction group in which each macroblock is assigned with said all-coarse prediction mode, an all-fine prediction group in which each macroblock is assigned with said all-fine prediction mode and a mix prediction group in which each macroblock is assigned with said mix prediction mode.

7. The encoding method as claimed in claim 4, wherein said encoding method has an all-coarse prediction mode, an all-fine prediction mode, and a mix prediction mode, and said plurality of macroblocks are classified in said step (b) into an all-coarse prediction group in which each macroblock is assigned with said all-coarse prediction mode, an all-fine prediction group in which each macroblock is assigned with said all-fine prediction mode and a mix prediction group in which each macroblock is assigned with said mix prediction mode.

8. The encoding method as claimed in claim 4, wherein said plurality of macroblocks are classified into at least two coding groups according to a coding gain derived from said fine and coarse prediction error values of each macroblock and a predicted mismatch error derived from said best-case and worst-case mismatch errors of each macroblock.

9. The encoding method as claimed in claim 8, wherein said encoding method has an all-coarse prediction mode, an all-fine prediction mode, and a mix prediction mode, and said plurality of macroblocks are classified in said step (b) into an all-coarse prediction group in which each macroblock is assigned with said all-coarse prediction mode, an all-fine prediction group in which each macroblock is assigned with said all-fine prediction mode and a mix prediction group in which each macroblock is assigned with said mix prediction mode.

10. The encoding method as claimed in claim 9, wherein the coding gain of a given macroblock divided by the predicted mismatch error of the given macroblock is defined as the coding efficiency of the given macroblock, and the given macroblock is then assigned with one of said all-coarse prediction mode, said all-fine prediction mode and said mix prediction mode according to the coding efficiency of the given macroblock.

11. The encoding method as claimed in claim 10, wherein a coding efficiency mean and a coding efficiency standard deviation are computed from the coding efficiencies of said plurality of macroblocks, and the given macroblock is assigned with one of said all-coarse prediction mode, said all-fine prediction mode and said mix prediction mode by comparing the coding efficiency of the given macroblock to values determined by said coding efficiency mean and said coding efficiency standard deviation.

12. The encoding method as claimed in claim 11, wherein the given macroblock is assigned with said all-coarse prediction mode if the coding efficiency of the given macroblock is smaller than the difference of said coding efficiency mean and a pre-determined multiple of said coding efficiency standard deviation, the given macroblock is assigned with said all-fine prediction mode if the coding efficiency of the given macroblock is larger than the sum of said coding efficiency mean and a pre-determined multiple of said coding efficiency standard deviation, and otherwise the given macroblock is assigned with said mix prediction mode.

13. A method for truncating bit-planes in an enhancement layer of a group of pictures for allocating bits sent to a client channel, comprising the steps of:
   (a) performing low-rate bit truncation if total bits available for allocation for said enhancement layer are less than or equal to total number of enhancement-layer bits in all I/P-frames in said group of pictures used for fine prediction;
   (b) performing medium-rate bit truncation if total bits available for allocation for said enhancement layer are less than or equal to total number of enhancement-layer bits in said group of pictures used for fine prediction but greater than total number of enhancement-layer bits in all I/P-frames in said group of pictures used for fine prediction; and
   (c) performing high-rate bit truncation if total bits available for allocation for said enhancement layer are greater than total number of enhancement-layer bits in said group of pictures used for fine prediction;
   wherein said low-rate bit truncation allocates each I/P-frames of said enhancement layer with a number of bits proportional to a ratio of the number of bits used for prediction in each I/P-frames to total number of bits used for fine prediction for all I/P-frames in said group of pictures, and allocates no bit to any B-frame of said enhancement layer.

14. The method for truncating bit-planes in an enhancement layer of a group of pictures for allocating bits sent to a client channel as claimed in claim 13, wherein said medium-rate bit truncation allocates each I/P-frames of said enhancement layer with a number of bits equal to the number of bits used for fine prediction in each I/P-frames, and allocates each B-frame of said enhancement layer with a number of bits proportional to a ratio of the number of enhancement-layer most significant bits used for fine prediction in each B-frame to total number of enhancement-layer most significant bits used for fine prediction for all B-frames in said group of pictures.

15. The method for truncating bit-planes in an enhancement layer of a group of pictures for allocating bits sent to a client channel as claimed in claim 14, wherein said high-rate bit truncation allocates each I/P-frames of said enhancement layer with a number of bits equal to the number of bits used for fine prediction in each I/P frames plus a number of bits proportional to a ratio of the number of bits used for fine prediction in each I/P-frames to the summation of total number of bits used for fine prediction for all I/P-frames in said group of pictures and total number of enhancement-layer most significant bits used for fine prediction for all B-frames in said group of pictures, and allocates each B-frame of said enhancement layer with a number of bits proportional to a ratio of the number of enhancement-layer most significant bits used for fine prediction in each B-frame to the summation of total number of bits used for fine prediction for all I/P-frames in said group of pictures and total number of enhancement-layer most significant bits used for fine prediction for all B-frames in said group of pictures.

16. The method for truncating bit-planes in an enhancement layer of a group of pictures for allocating bits sent to a client channel as claimed in claim 15, wherein said medium-rate bit truncation allocates each I/P-frames of said enhancement layer with a number of bits equal to the number of bits used for fine prediction in each I/P-frames, and allocates each B-frame of said enhancement layer with a number of bits proportional to a ratio of the number of enhancement-layer most significant bits used for fine prediction in each B-frame to total number of enhancement-layer most significant bits used for fine prediction for all B-frames in said group of pictures.

17. A method for truncating bit-planes in an enhancement layer of a group of pictures for allocating bits sent to a client channel, comprising the steps of:
   (a) performing low-rate bit truncation if total bits available for allocation for said enhancement layer are less than or equal to total number of enhancement-layer bits in all I/P-frames in said group of pictures used for fine prediction;
   (b) performing medium-rate bit truncation if total bits available for allocation for said enhancement layer are less than or equal to total number of enhancement-layer bits in said group of pictures used for fine prediction but greater than total number of enhancement-layer bits in all I/P-frames in said group of pictures used for fine prediction; and
   (c) performing high-rate bit truncation if total bits available for allocation for said enhancement layer are greater than total number of enhancement-layer bits in said group of pictures used for fine prediction;
   wherein said high-rate bit truncation allocates each I/P-frames of said enhancement layer with a number of bits equal to the number of bits used for fine prediction in each I/P frames plus a number of bits proportional to a ratio of the number of bits used for fine prediction in each I/P-frames to the summation of total number of bits used for fine prediction for all I/P-frames in said group of pictures and total number of enhancement-layer most significant bits used for fine prediction for all B-frames in said group of pictures, and allocates each B-frame of said enhancement layer with a number of bits proportional to a ratio of the number of enhancement-layer most significant bits used for fine prediction in each B-frame to the summation of total number of bits used for fine prediction for all I/P-frames in said group of pictures and total number of enhancement-layer most significant bits used for fine prediction for all B-frames in said group of pictures.

* * * * *